US012812498B2

(12) United States Patent
Hua et al.

(10) Patent No.: US 12,812,498 B2
(45) Date of Patent: Nov. 24, 2026

(54) TRAFFIC SENDING METHOD, APPARATUS, AND SYSTEM, AND STORAGE MEDIUM

(71) Applicant: Huawei Technologies Co., Ltd., Shenzhen (CN)

(72) Inventors: Rongrong Hua, Nanjing (CN); Zhouyi Yu, Beijing (CN); Tao Peng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 395 days.

(21) Appl. No.: 18/360,993

(22) Filed: Jul. 28, 2023

(65) Prior Publication Data

US 2023/0370938 A1 Nov. 16, 2023

Related U.S. Application Data

(63) Continuation of application No. PCT/CN2022/073257, filed on Jan. 21, 2022.

(30) Foreign Application Priority Data

Jan. 29, 2021 (CN) ......................... 202110127680.3
Apr. 30, 2021 (CN) ......................... 202110485634.0

(51) Int. Cl.
*H04W 40/02* (2009.01)

(52) U.S. Cl.
CPC .................................. *H04W 40/02* (2013.01)

(58) Field of Classification Search
CPC ..................................................... H04W 40/02
See application file for complete search history.

(56) References Cited

U.S. PATENT DOCUMENTS

2019/0254118 A1* 8/2019 Dao ...................... H04L 67/141
2019/0349268 A1 11/2019 Pai et al.
2022/0247688 A1* 8/2022 Puente Pestaña ....... H04L 45/64

OTHER PUBLICATIONS

Clad F et al: "Segment Routing for Service Chaining; draft-xu-clad-spring-sr-service-chaining-00. txt", Segment Routing for Service Chaining; DRAFT-XU-CLAD-SPRING-SR-SERVICE-CHAINING-00.TXT; Internet-Draft: Spring Internet Engineering Task Force, IETF; Standardworkingdraft, Internet Society (ISOC) 4, Rue Des Falaises CH-1205 Geneva, Switzerland, Dec. 22, 2017(Dec. 22, 2017) , pp. 1-35, XP015124914.

(Continued)

*Primary Examiner* — Elton Williams
(74) *Attorney, Agent, or Firm* — Slater Matsil, LLP

(57) ABSTRACT

This application discloses a traffic sending method. The method includes: a control plane device obtains, based on a packet sent by a terminal, a first service function combination corresponding to the terminal, where the first service function combination includes at least one service function. The control plane device configures a first policy on a user plane device based on the first service function combination, the first policy indicates a first service chain, and the first service chain corresponds to the first service function combination. The control plane device sends first user entry information to the user plane device, where the first user entry information includes an identifier of the first policy and an identifier of the terminal, and the first user entry information indicates the user plane device to send traffic from the terminal to the first service chain based on the first policy.

19 Claims, 10 Drawing Sheets

(56) References Cited

OTHER PUBLICATIONS

Dawra G et al: "BGP Control Plane Extensions for Segment Routing based Service Chaining; draft-dawra-idr-bgp-sr-service-chaining-02.txt", BGP Control Plane Extensions for Segment Routingbased Service Chaining; DRAFT-DAWRA-IDR-BGP-SR-SERVICE-CHAINING-02.TXT; Internet-Draft: Inter-Domain Routin, Internet Engineering Task Force, IETF; Standardworkingdraft, Internet Society (ISOC) 4, RUE, No. 2, Jan. 4, 2018 (Jan. 4, 2018) , pp. 1-13, XP015125016.

Paolucci Francesco: "Network service chaining using segment routing in multi-layer networks", Journal of Optical Communications and Networking, IEEE, USA, vol. 10, No. 6, Jun. 1, 2018 (Jun. 1, 2018) , pp. 582-592, XP011685201, ISSN: 1943-0620, DOI: 10.1364/JOCN.10.000582.

S. Hu et al., RFC 8772 The China Mobile, Huawei, and ZTE Broadband Network Gateway (BNG) Simple Control User Plane Separation Protocol (S-CUSP), May 2020, total 124 pages.

* cited by examiner

TRAFFIC SENDING METHOD, APPARATUS, AND SYSTEM, AND STORAGE MEDIUM

CROSS-REFERENCE TO RELATED APPLICATIONS

This application is a continuation of International Application No. PCT/CN2022/073257, filed on Jan. 21, 2022, which claims priority to Chinese Patent Application No. 202110127680.3, filed on Jan. 29, 2021 and Chinese Patent Application No. 202110485634.0, filed on Apr. 30, 2021. All of the aforementioned patent applications are hereby incorporated by reference in their entireties.

TECHNICAL FIELD

This application relates to the communication field, and in particular, to a traffic sending method, apparatus, and system, and a storage medium.

BACKGROUND

A broadband network gateway (BNG) may be classified into a control plane (CP) device and a plurality of user plane (UP) devices. The CP device is configured to control each UP device, and each UP device is configured to forward traffic of a terminal. When forwarding traffic, the UP device may further perform one or more service functions on the traffic. These service functions may include one or more of address translation, traffic cleaning, lawful monitoring, and the like.

To perform a service function on traffic of a user, N existing service functions are combined to obtain (N+1)*N/2 service combinations, where N is an integer greater than 1. Each service combination includes some or all of the N service functions, and different service combinations correspond to different address pools. A remote authentication dial-in user service (Radius) server includes a correspondence between a service combination and an address pool, and the correspondence is used to store each service combination and an address pool corresponding to each service combination. The Radius server further includes a correspondence between account information and a service combination, and each record in the correspondence includes account information of the user and a service combination subscribed to by the user from a carrier. Each UP device includes a correspondence between an address pool and a policy, and the correspondence is used to store an address pool corresponding to each service combination and a policy corresponding to each service combination. The policy corresponding to the service combination indicates a service chain corresponding to the service combination, and the service chain includes an entity configured to implement service functions in the service combination.

In one case, the UP device receives a dialing request of the terminal, where the dialing request includes account information of the terminal, and sends the dialing request to the CP device. The CP device sends the account information to the Radius server. The Radius server obtains a corresponding service combination based on the account information, and sends an address pool corresponding to the service combination to the CP device. The CP device allocates an address to the terminal from the address pool corresponding to the service combination, and sends the address to the terminal. The terminal sends traffic to the UP device, where the traffic includes the address. The UP device receives the traffic, obtains the address pool to which the address belongs, obtains a policy corresponding to the address pool, and sends, according to the policy, the traffic of the terminal to a service chain indicated by the policy.

In a process of implementing this application, the inventor finds that the conventional technology has at least the following problems:

The Radius server needs to prestore a large quantity of correspondences between different service combinations and different address pools. Each UP device needs to prestore a large quantity of correspondences between different address pools and different policies. Even if some service combinations are not subscribed to by the user, policies need to be allocated to these service combinations. Consequently, in the conventional technology, large quantities of storage resources of the Radius server and the UP device are consumed, and a large quantity of policy resources are wasted.

SUMMARY

This application provides a traffic sending method, apparatus, and system, and a storage medium, to consume fewer storage resources of a user plane device and a server, and consume fewer policy resources. The technical solutions are as follows:

According to a first aspect, this application provides a traffic sending method. In the method, a control plane device obtains, based on a packet sent by a terminal, a first service function combination corresponding to the terminal, where the first service function combination includes at least one service function. The control plane device configures a first policy on a user plane device based on the first service function combination, where the user plane device is a user plane device accessed by the terminal, the first policy indicates a first service chain, and the first service chain corresponds to the first service function combination. The control plane device sends first user entry information to the user plane device, where the first user entry information includes an identifier of the first policy and an identifier of the terminal, and the first user entry information indicates the user plane device to send traffic from the terminal to the first service chain based on the first policy.

Because the control plane device configures, on the user plane device, the first policy corresponding to the first service function combination only when receiving the packet sent by the terminal, the first policy does not need to be preconfigured for the first service function combination, thereby avoiding a waste of policy resources. In addition, the control plane device sends the first user entry information to the user plane device, and the first user entry information includes the identifier of the terminal and the identifier of the first policy. After receiving the traffic of the terminal, the user plane device obtains the first policy based on the identifier of the terminal included in the traffic and the first user entry information, and ensures, based on the first policy, that the traffic can be successfully sent to the first service chain. Therefore, a large quantity of service function combinations do not need to be preconfigured, and different address pools do not need to be allocated to each service function combination, a policy and an address pool corresponding to each service function combination do not need to be stored in the user plane device in advance, and the server does not need to store each service function combination and an address pool corresponding to the service function combination. In this way, fewer storage resources of the user plane device can be consumed, and fewer storage resources of the server can be consumed. In addition, because content included in the user entry information is the identifier of the first policy and the identifier of the terminal, the first policy may be refined to a terminal granularity.

In a possible implementation, the first policy includes a first segment list, and the first segment list includes a segment identifier of the first service function combination. The first service chain includes a service function entity corresponding to the segment identifier. In this way, the first policy indicates the first service chain, and it can be ensured that the traffic of the terminal is sent to the first service chain based on the first policy.

In another possible implementation, the first policy includes information about a tunnel between the user plane device and a first service function forwarder SFF, and the first SFF is associated with the first service chain. In this way, the first policy indicates the first service chain, so that it can be ensured that the traffic of the terminal is sent to the first service chain based on the first policy.

In another possible implementation, the control plane device generates the first policy based on the first service function combination, and the control plane device sends the first policy to the user plane device. Because the control plane device obtains the first service function combination only after receiving the packet sent by the terminal, and generates the first policy based on the first service function combination, the first policy is configured for the first service function combination of the terminal only after the terminal accesses the user plane device, thereby avoiding a waste of policy resources.

In another possible implementation, the first policy includes the information about the tunnel between the user plane device and the first SFF. The control plane device sends routing information to the first SFF, where the routing information includes the identifier of the terminal, and the routing information indicates the first SFF to send the traffic from the terminal to the first service chain. In this way, the user plane device may forward the traffic of the terminal to the first SFF based on the first policy, and the first SFF sends the traffic to the first service chain based on the routing information, to ensure that the traffic of the terminal is sent to the first service chain.

In another possible implementation, the control plane device sends first information to a controller, where the first information includes an identifier of each service function in the first service function combination and an identifier of the user plane device, and the first information is used to trigger the controller to configure the first policy on the user plane device. The control plane device sends the identifier of each service function in the first service function combination and the identifier of the user plane device to the user plane device, so that when the terminal sends the packet, the controller configures, on the user plane device, the first policy for the first service function combination corresponding to the terminal, thereby avoiding a waste of policy resources.

In another possible implementation, the control plane device receives second information sent by the controller, where the second information includes the identifier of the first policy. In this way, it is ensured that the first user entry information sent by the control plane device to the user plane device includes the identifier of the first policy.

In another possible implementation, the first policy includes the information about the tunnel between the user plane device and the first SFF, the first information further includes the identifier of the terminal, the first information is used to trigger the controller to send routing information to the first SFF, and the routing information indicates the first SFF to send the traffic from the terminal to the first service chain. In this way, the user plane device may forward the traffic of the terminal to the first SFF based on the first policy, and the first SFF sends the traffic to the first service chain based on the information about the tunnel in the routing information, to ensure that the traffic of the terminal is sent to the first service chain.

In another possible implementation, the control plane device obtains application information of a first application, where the first application is an application on the terminal, and the first policy includes the application information of the first application. Because the first policy includes the application information of the first application, the user plane device is triggered to send traffic of the first application to the first service chain corresponding to the first application.

In another possible implementation, the packet sent by the terminal includes a dialup packet, where the dialup packet includes terminal information of the terminal, and the terminal information includes one or more of the identifier of the terminal and account information corresponding to the terminal. The control plane device obtains the first service function combination based on the terminal information. In this way, the first policy is configured for the first service function combination corresponding to the terminal only when the terminal performs dialing, thereby avoiding a waste of policy resources.

In another possible implementation, the packet sent by the terminal includes a data packet or an address resolution protocol ARP packet, the terminal is a terminal that obtains a static address, the data packet includes the identifier of the terminal, and the ARP packet includes the identifier of the terminal. The control plane device obtains the first service function combination based on the identifier of the terminal. In this way, the first policy is configured for the first service function combination corresponding to the terminal only when the terminal sends a traffic packet, thereby avoiding a waste of policy resources.

In another possible implementation, the control plane device receives an update message, where the update message includes a second service function combination corresponding to the terminal, the second service function combination includes at least one service function, and the first service function combination is different from the second service function combination. The control plane device configures a second policy on the user plane device based on the second service function combination, where the second policy indicates a second service chain, and the second service chain corresponds to the second service function combination. The control plane device sends second user entry information to the user plane device, where the second user entry information includes an identifier of the second policy and the identifier of the terminal, and the second user entry information indicates the user plane device to send the traffic from the terminal to the second service chain based on the second policy. Because the second user entry information includes the identifier of the terminal and the identifier of the second policy, when receiving the traffic of the terminal, the user plane device sends the traffic to the second service chain based on the identifier of the terminal and the second user entry information. In this way, when the service function combination corresponding to the terminal changes from the first service function combination to the second service function combination, the terminal may change the service function combination for the terminal without redialing, thereby simplifying change complexity and avoiding service interruption of the terminal.

According to a second aspect, this application provides a traffic sending method. In the method, a controller receives first information sent by a control plane device, where the first information includes an identifier of each service function in a first service function combination and an identifier of a user plane device, the first service function combination includes at least one service function corresponding to a terminal, the first service function combination is obtained by the control plane device based on a packet sent by the terminal, and the user plane device is a user plane device accessed by the terminal. The controller configures a first policy on the user plane device based on the first information, where the first policy indicates a first service chain, and the first service chain corresponds to the first service function combination. The controller sends second information to the control plane device, where the second information includes an identifier of the first policy, the second information is used to trigger the control plane device to send first user entry information to the user plane device, the first user entry information includes an identifier of the terminal and the identifier of the first policy, and the first user entry information indicates the user plane device to send traffic from the terminal to the first service chain based on the first policy.

Because the first information sent by the control plane device includes the identifier of each service function in the first service function combination and the identifier of the user plane device, and the user plane device is a device accessed by the terminal, the controller configures the first policy that corresponds to the service function combination corresponding to the terminal on the user plane device based on the first information. In this way, the first policy corresponding to the first service function combination is configured on the user plane device only when the terminal sends the packet. Therefore, the first policy does not need to be preconfigured for the first service function combination, thereby avoiding a waste of policy resources. In addition, because the first information sent by the controller to the control plane device includes the identifier of the first policy, the first user entry information sent by the control plane device to the user plane device includes the identifier of the terminal and the identifier of the first policy. In this way, after receiving the traffic of the terminal, the user plane device obtains the first policy based on the identifier of the terminal included in the traffic and the first user entry information, and sends the traffic to the first service chain based on the first policy. In this way, a large quantity of service function combinations do not need to be preconfigured, different address pools do not need to be allocated to each service function combination, each service function combination and an address pool corresponding to each service function combination do not need to be stored in the server, and a correspondence between an address pool of each service function combination and a policy does not need to be stored in the user plane device. In this way, fewer storage resources of the user plane device can be consumed, and fewer storage resources of the server can be consumed. In addition, because content included in the user entry information is the identifier of the first policy and the identifier of the terminal, the first policy may be refined to a terminal granularity.

In a possible implementation, the controller generates the first policy based on an identifier of each service function in the first service function combination. The controller sends the first policy to the user plane device based on the identifier of the user plane device. In this way, the user plane device includes the first policy, and when the user plane device obtains the user entry information including the identifier of the terminal and the identifier of the first policy, the user plane device can forward the received traffic from the terminal to the first service chain based on the user entry information and the first policy.

In another possible implementation, the first policy includes a first segment list, and the first segment list includes a segment identifier of the first service function combination. The first service chain includes a service function entity corresponding to the segment identifier. In this way, the first policy indicates the first service chain, and it can be ensured that the traffic of the terminal is sent to the first service chain based on the first policy.

In another possible implementation, the first policy includes information about a tunnel between the user plane device and a first service function forwarder SFF, and the first SFF is associated with the first service chain. In this way, the first policy indicates the first service chain, and it can be ensured that the traffic of the terminal is sent to the first service chain based on the first policy.

In another possible implementation, the first information further includes the identifier of the terminal. The controller sends routing information to the first SFF, where the routing information includes the identifier of the terminal, and the routing information indicates the first SFF to send the traffic from the terminal to the first service chain. In this way, when receiving the traffic of the terminal, the first SFF sends the traffic to the first service chain based on the routing information, thereby ensuring that the traffic of the terminal is sent to the first service chain.

In another possible implementation, the first information further includes application information of a first application, the first application is an application on the terminal, and the first policy includes the application information of the first application. Because the first policy includes the application information of the first application, the user plane device is triggered to send traffic of the first application to the first service chain corresponding to the first application.

In another possible implementation, the packet sent by the terminal includes a dialup packet, the dialup packet includes terminal information of the terminal, the terminal information includes one or more of the identifier of the terminal, a location of the terminal, and account information corresponding to the terminal, and the first service function combination is obtained by the control plane device based on the terminal information. In this way, the first policy is configured for the first service function combination corresponding to the terminal only when the terminal performs dialing, thereby avoiding a waste of policy resources.

In another possible implementation, the packet sent by the terminal includes a data packet or an address resolution protocol ARP packet, the terminal is a terminal that obtains a static address, the data packet includes the identifier of the terminal, the ARP packet includes the identifier of the terminal, and the first service function combination is obtained by the control plane device based on the identifier of the terminal. In this way, the first policy is configured for the first service function combination corresponding to the terminal only when the terminal sends a traffic packet, thereby avoiding a waste of policy resources.

According to a third aspect, this application provides a traffic sending method. In this method, a user plane device receives a first policy, where the user plane device is a user plane device accessed by a terminal, the first policy is obtained based on a first service function combination, the first service function combination is obtained by a control plane device based on a packet sent by the terminal, the first service function combination includes at least one service function corresponding to the terminal, the first policy indicates a first service chain, and the first service chain corresponds to the first service function combination. The user plane device receives first user entry information sent by the control plane device, where the first user entry information includes an identifier of the first policy and an identifier of the terminal, and the first user entry information indicates the user plane device to send traffic from the terminal to the first service chain based on the first policy.

The first service function combination is obtained by the control plane device based on the packet sent by the terminal, and the first policy received by the user plane device is obtained by the control plane device based on the first service function combination. Therefore, the first policy corresponding to the first service function combination is configured on the user plane device only when the terminal sends the packet, and the first policy does not need to be preconfigured for the first service function combination, thereby avoiding a waste of resources. In addition, because the first user entry information that is sent by the control plane device and that is received by the user plane device includes the identifier of the terminal and the identifier of the first policy, after receiving the traffic of the terminal, the user plane device obtains the first policy based on the identifier of the terminal included in the traffic and the first user entry information, and sends the traffic to the first service chain based on the first policy. In this way, a large quantity of service function combinations do not need to be preconfigured, and different address pools do not need to be allocated to each service function combination. The server does not need to store each service function combination and an address pool corresponding to each service function combination. The user plane device does not need to store an address pool and a policy that correspond to each service function combination. In this way, not only fewer storage resources of the user plane device and the server can be consumed, but also fewer policy resources can be consumed. In addition, because content included in the user entry information is the identifier of the first policy and the identifier of the terminal, the first policy may be refined to a terminal granularity.

In a possible implementation, the user plane device receives a second policy, where the second policy is obtained based on a second service function combination, the second service function combination includes at least one service function corresponding to the terminal, the second service function combination is different from the first service function combination, the second policy indicates a second service chain, and the second service chain corresponds to the second service function combination. The user plane device receives second user entry information sent by the control plane device, where the second user entry information includes an identifier of the second policy and the identifier of the terminal. The user plane device updates the first user entry information to the second user entry information. Because the second user entry information includes the identifier of the terminal and the identifier of the second policy, when receiving the traffic of the terminal, the user plane device obtains the second policy based on the identifier of the terminal included in the traffic and the second user entry information, and sends the traffic to the second service chain based on the second policy. In this way, when the service function combination corresponding to the terminal changes from the first service function combination to the second service function combination, the terminal may change the service function combination for the terminal without re-dialing, thereby simplifying change complexity and avoiding service interruption of the terminal.

In another possible implementation, the first policy includes a first segment list, and the first segment list includes a segment identifier of the first service function combination. The first service chain includes a service function entity corresponding to the segment identifier. In this way, the first policy indicates the first service chain, and it can be ensured that the traffic of the terminal is sent to the first service chain based on the first policy.

In another possible implementation, the first policy includes information about a tunnel between the user plane device and a first service function forwarder SFF, and the first SFF is associated with the first service chain. In this way, the first policy indicates the first service chain, so that it can be ensured that the traffic of the terminal is sent to the first service chain based on the first policy.

In another possible implementation, the first policy further includes application information of a first application, and the first application is an application on the terminal. Because the first policy includes the application information of the first application, the user plane device is triggered to send traffic of the first application to the first service chain corresponding to the first application.

In another possible implementation, the packet sent by the terminal includes a dialup packet, where the dialup packet includes terminal information of the terminal, the terminal information includes one or more of the identifier of the terminal, a location of the terminal, and account information corresponding to the terminal, and the first service function combination is obtained by the control plane device based on the terminal information. In this way, the first policy is configured for the first service function combination corresponding to the terminal only when the terminal performs dialing, thereby avoiding a waste of policy resources.

In another possible implementation, the packet sent by the terminal includes a data packet or an address resolution protocol ARP packet, the terminal is a terminal that obtains a static address, the data packet includes the identifier of the terminal, the ARP packet includes the identifier of the terminal, and the first service function combination is obtained by the control plane device based on the identifier of the terminal. In this way, the first policy is configured for the first service function combination corresponding to the terminal only when the terminal sends a traffic packet, thereby avoiding a waste of policy resources.

According to a fourth aspect, this application provides a traffic sending apparatus, configured to perform the method according to the first aspect or any one of the possible implementations of the first aspect. Specifically, the apparatus includes units configured to perform the method in the first aspect or any one of the possible implementations of the first aspect.

According to a fifth aspect, this application provides a traffic sending apparatus, configured to perform the method according to the second aspect or any one of the possible implementations of the second aspect. Specifically, the apparatus includes units configured to perform the method in the second aspect or any one of the possible implementations of the second aspect.

According to a sixth aspect, this application provides a traffic sending apparatus, configured to perform the method according to the third aspect or any one of the possible implementations of the third aspect. Specifically, the apparatus includes units configured to perform the method in the third aspect or any one of the possible implementations of the third aspect.

According to a seventh aspect, this application provides a traffic sending apparatus. The apparatus includes a processor and a memory. The processor and the memory may be connected through an internal connection. The memory is configured to store a program, and the processor is configured to execute the program in the memory, to enable the apparatus to complete the method according to the first aspect or any one of the possible implementations of the first aspect.

According to an eighth aspect, this application provides a traffic sending apparatus. The apparatus includes a processor and a memory. The processor and the memory may be connected through an internal connection. The memory is configured to store a program, and the processor is configured to execute the program in the memory, to enable the apparatus to complete the method according to the second aspect or any one of the possible implementations of the second aspect.

According to a ninth aspect, this application provides a traffic sending apparatus. The apparatus includes a processor and a memory. The processor and the memory may be connected through an internal connection. The memory is configured to store a program, and the processor is configured to execute the program in the memory, to enable the apparatus to complete the method according to the third aspect or any one of the possible implementations of the third aspect.

According to a tenth aspect, this application provides a computer program product. The computer program product includes a computer program stored in a computer-readable storage medium, and the computer program is loaded by a processor to implement the method according to the first aspect, the second aspect, the third aspect, any one of the possible implementations of the first aspect, any one of the possible implementations of the second aspect, or any one of the possible implementations of the third aspect.

According to an eleventh aspect, this application provides a computer-readable storage medium. The computer-readable storage medium is configured to store a computer program, and the computer program is loaded by a processor to execute the method according to the first aspect, the second aspect, the third aspect, any one of the possible implementations of the first aspect, any one of the possible implementations of the second aspect, or any one of the possible implementations of the third aspect.

According to a twelfth aspect, this application provides a chip, including a memory and a processor. The memory is configured to store computer instructions, and the processor is configured to invoke the computer instructions from the memory and run the computer instructions, to perform the method according to the first aspect, the second aspect, the third aspect, any one of the possible implementations of the first aspect, any one of the possible implementations of the second aspect, or any one of the possible implementations of the third aspect.

According to a thirteenth aspect, this application provides a traffic sending system, where the system includes the apparatus according to the fourth aspect, the apparatus according to the fifth aspect, and the apparatus according to the sixth aspect; or the system includes the apparatus according to the seventh aspect, the apparatus according to the eighth aspect, and the apparatus according to the ninth aspect.

DETAILED DESCRIPTION OF ILLUSTRATIVE EMBODIMENTS

The following further describes in detail embodiments of this application with reference to accompanying drawings.

The following describes terms in embodiments of this application.

A control plane is configured to perform operations such as control and/or management on a user plane. A device located on the control plane is configured to perform operations such as control and/or management on a device located on the user plane. The control plane device includes a broadband network gateway control plane (BNG-CP) device and the like provided in any one of the following embodiments.

A user plane is configured to transmit traffic of a terminal and/or process traffic of the terminal, and the traffic is traffic between the terminal and a backbone network. The user plane device includes a broadband network gateway user plane (BNG-UP) device and the like provided in any one of the following embodiments.

A service function is located on a service function entity, where the service function entity is configured to execute the service function, the service function corresponds to at least one service, and when receiving traffic of a terminal, the service function entity processes the traffic based on the service function, to provide the service for the traffic. The service function may also be referred to as a value add service (VAS). The service function entity may be a device (for example, a server), or a function entity on the device. One or more function entities may be integrated on the device.

Figure 1:
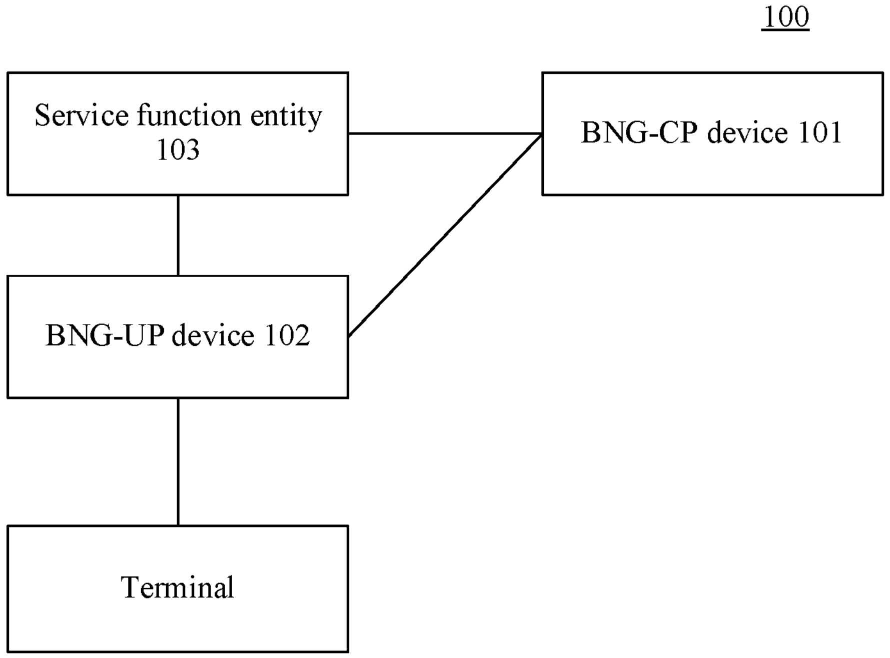
FIG. 1 is a schematic diagram of a network architecture according to an embodiment of this application.

Refer to FIG. 1. An embodiment of this application provides a network architecture 100. The network architecture 100 is applied to a BNG whose control plane and user plane are separated, and includes:

a BNG-CP device 101, a BNG-UP device 102, and at least one service function entity 103. The BNG-UP device 102 separately communicates with the BNG-CP device 101 and each service function entity 103.

In some embodiments, the BNG-CP device 101 further communicates with each service function entity 103.

The BNG-CP device 101 is located on the control plane, and the BNG-UP device 102 is located on the user plane. The BNG-CP device 101 is configured to control and/or manage the BNG-UP device 102.

For example, the BNG-CP device 101 is configured to determine a first service function combination corresponding to a terminal, where the first service function combination includes at least one service function corresponding to the terminal; configure a first policy on the BNG-UP device 102 accessed by the terminal, where the first policy indicates a first service chain, and the first service chain corresponds to the first service function combination; and send first user entry information to the BNG-UP device 102, where the first user entry information includes an identifier of the first policy and an identifier of the terminal. The first service chain includes at least one service function entity 103, and each service function entity 103 has one or more service functions in the first service function combination.

The BNG-UP device 102 is configured to: receive traffic of the terminal, obtain the first policy based on the identifier of the terminal included in the traffic and the first user entry information, and send the traffic to the first service chain based on the first policy.

In some embodiments, the network architecture 100 may include one or more BNG-UP devices 102.

For each service function entity 103, the service function entity 103 has at least one service function. When receiving the traffic of the terminal, the service function entity 103 may process the traffic of the terminal based on the at least one service function, to provide a service corresponding to the at least one service function for the traffic of the terminal.

Figure 2:
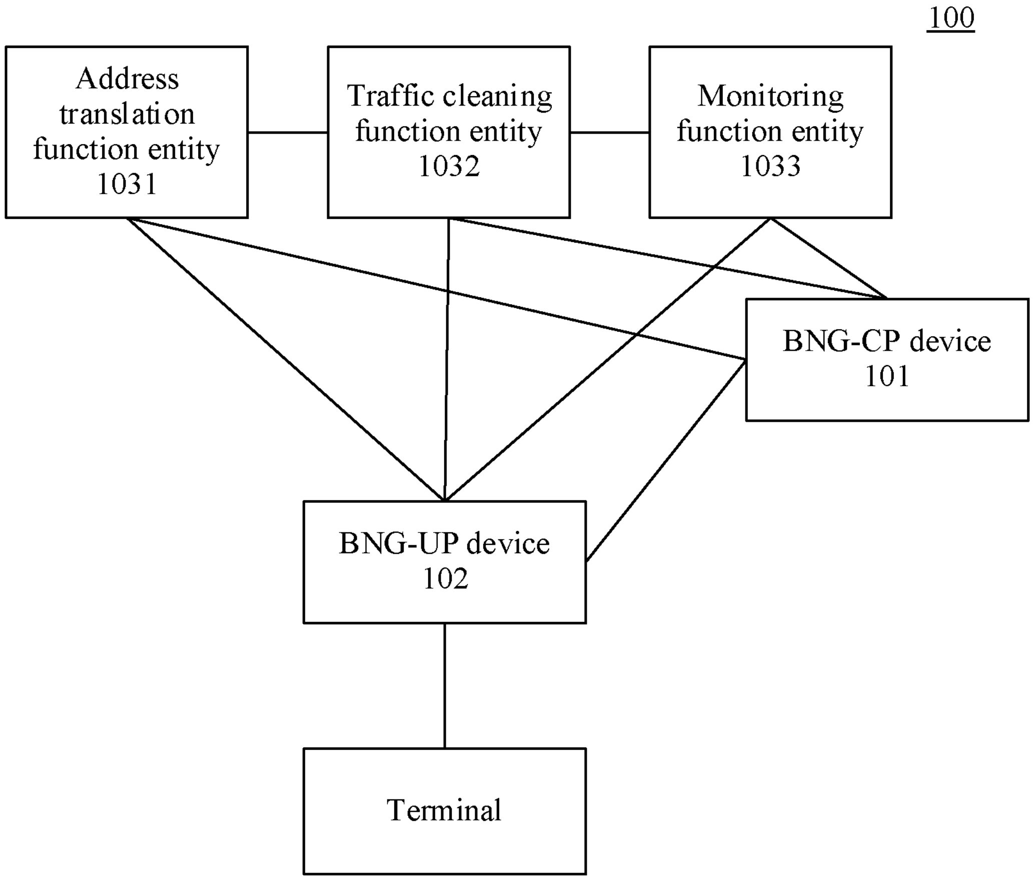
FIG. 2 is a schematic diagram of another network architecture according to an embodiment of this application.

For example, refer to FIG. 2. The at least one service function entity 103 includes an address translation function entity 1031, a traffic cleaning function entity 1032, and a monitoring function entity 1033.

A service function of the address translation function entity 1031 is an address translation function, and a service corresponding to the address translation function is an address translation service. When receiving the traffic of the terminal, the address translation function entity 1031 performs address translation processing on the traffic of the terminal based on the address translation function. A process of address translation processing is to translate a private network address of the traffic into a public network address, or to translate a public network address of the traffic into a private network address, so as to provide the address translation service for the traffic.

The traffic cleaning function entity 1032 has a traffic cleaning function, and a service corresponding to the traffic cleaning function is a traffic cleaning service. When receiving the traffic of the terminal, the traffic cleaning function entity 1032 performs cleaning processing on the traffic of the terminal based on the traffic cleaning function. A process of cleaning processing is to detect whether the traffic of the terminal is abnormal traffic, so as to provide the traffic cleaning service for the traffic.

In some embodiments, when detecting that the traffic is abnormal traffic, the traffic cleaning function entity 1032 may further clear the traffic, and when detecting that the traffic is not abnormal, forward the traffic to a next-hop device.

The monitoring function entity 1033 has a monitoring function, and a service corresponding to the monitoring function is a monitoring service. When receiving the traffic of the terminal, the monitoring function entity 1033 performs monitoring processing on the traffic based on the monitoring function. A process of monitoring processing is to monitor whether the traffic of the terminal includes one or more pieces of abnormal information such as a virus and a Trojan horse, so as to provide the monitoring service for the traffic.

In some embodiments, when detecting that the traffic includes abnormal information, the monitoring function entity 1033 may further remove the abnormal information from the traffic and/or perform processing such as alarming on the traffic.

Figure 3:
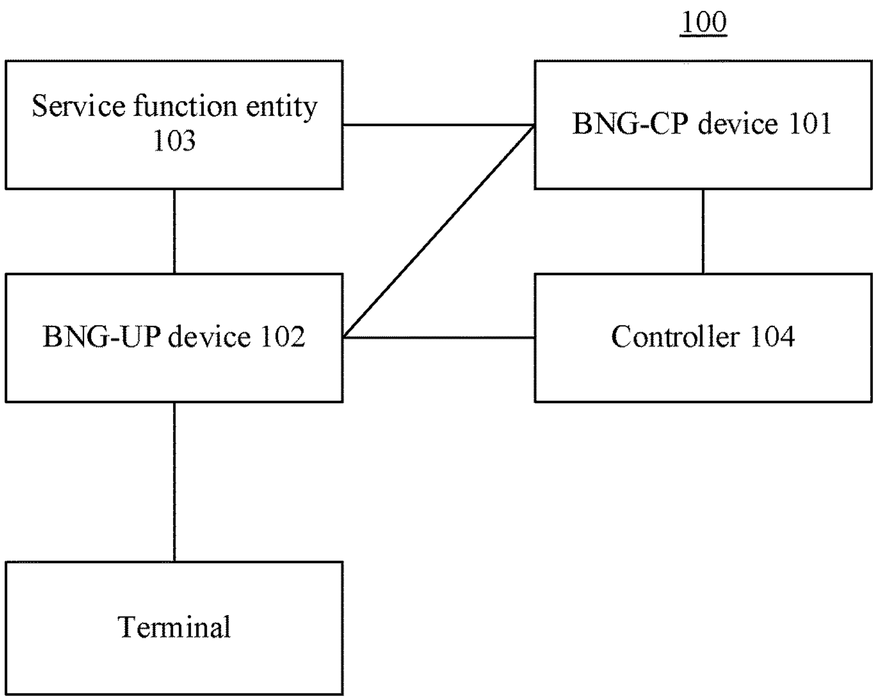
FIG. 3 is a schematic diagram of another network architecture according to an embodiment of this application.

Refer to FIG. 3. The network architecture 100 further includes a controller 104, and the controller 104 separately communicates with the BNG-CP device 101 and each BNG-UP device 102.

The BNG-CP device 101 may configure the first policy on the BNG-UP device 102 by using the controller 104.

For example, it is assumed that the service function corresponding to the terminal includes three service functions, and the three service functions are respectively the address translation function, the traffic cleaning function, and the monitoring function. The BNG-CP device 101 configures, by using the controller 104, the first policy on the BNG-UP device 102 accessed by the terminal. The first service chain indicated by the first policy includes the address translation function entity 1031, the traffic cleaning function entity 1032, and the monitoring function entity 1033. The first service chain has three service functions, where the three service functions are the address translation function in the address translation function entity 1031, the traffic cleaning function in the traffic cleaning function entity 1032, and the monitoring function in the monitoring function entity 1033 respectively.

After the BNG-UP device 102 sends the traffic of the terminal to the first service chain, the traffic sequentially passes through the address translation function entity 1031, the traffic cleaning function entity 1032, and the monitoring function entity 1033.

The address translation function entity 1031 receives the traffic, and performs address translation processing on the traffic based on the address translation function included in the address translation function entity 1031, that is, translates an address of the traffic (for example, translates a private network address of the traffic into a public network address), to provide the address translation service corresponding to the address translation function for the traffic. After translating the address of the traffic, the address translation function entity 1031 forwards the traffic on which address translation is performed.

The traffic cleaning function entity 1032 receives the traffic on which address translation is performed, and performs cleaning processing on the traffic based on the traffic cleaning function included in the traffic cleaning function entity 1032, that is, detects whether the traffic is abnormal traffic, to provide the traffic cleaning service corresponding to the traffic cleaning function for the traffic. When detecting that the traffic is not abnormal, the traffic cleaning function entity 1032 forwards the traffic.

The monitoring function entity 1033 receives the traffic, and performs monitoring processing on the traffic based on the monitoring function included in the monitoring function entity 1033, that is, monitors whether the traffic includes abnormal information, to provide the monitoring service corresponding to the monitoring function for the traffic. When detecting that the traffic does not include abnormal information, the monitoring function entity 1033 forwards the traffic to the network.

Figure 4:
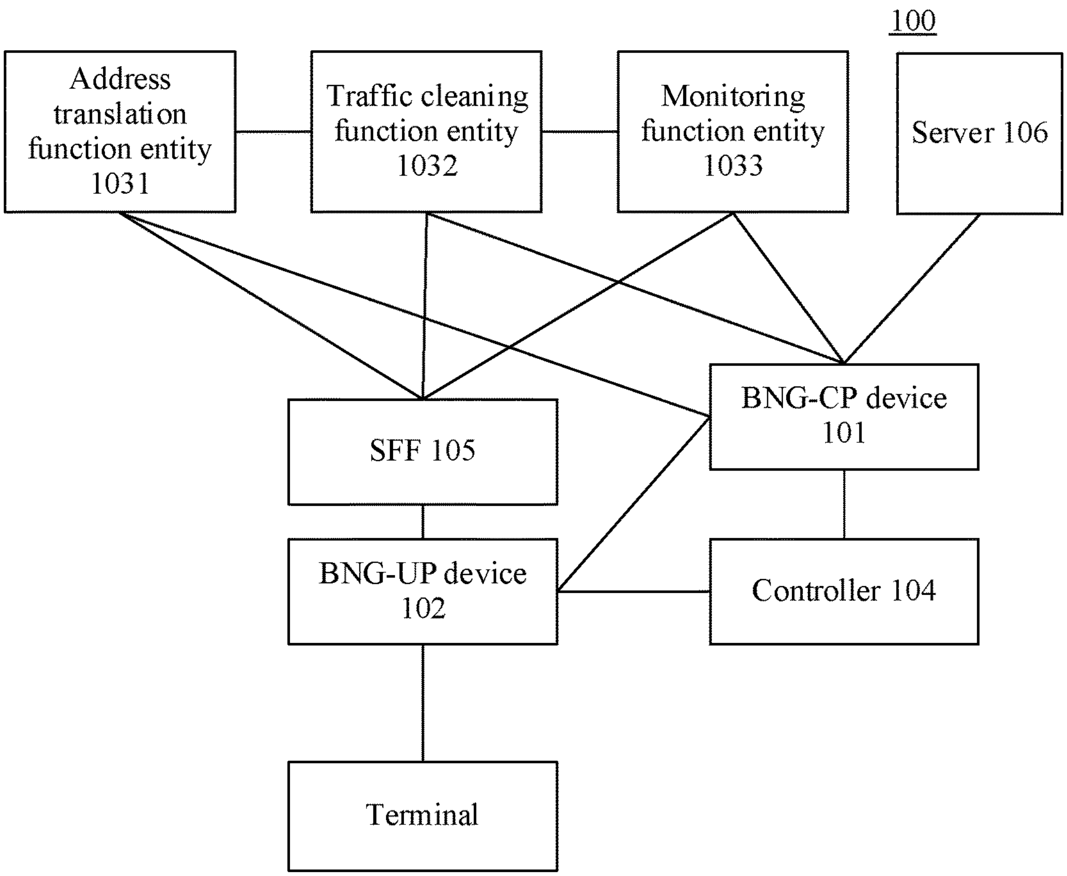
FIG. 4 is a schematic diagram of another network architecture according to an embodiment of this application.

Refer to FIG. 4. The network architecture 100 further includes at least one service function forwarder (SFF) 105, and the BNG-UP device 102 communicates with the at least one service function entity 103 by using the at least one SFF 105. The at least one SFF 105 further communicates with the controller 104.

For the first policy configured on the BNG-UP device 102, the first policy indicates the first SFF, and the first SFF is associated with the first service chain indicated by the first policy.

After receiving the traffic of the terminal, the BNG-UP device 102 sends the traffic of the terminal to the first SFF based on the first policy. The first SFF receives the traffic and sends the traffic to a first service function entity. The first service function entity is a service function entity corresponding to a first service function, and the first service function is one of the at least one service function included in the first service function combination. The first service function entity receives the traffic, processes the traffic based on the first service function, and sends the processed traffic to the first SFF. The first SFF receives the processed traffic, and sends, in the same manner as the foregoing, the traffic to a service function entity corresponding to another service function.

For example, refer to FIG. 4. The first service chain includes the address translation function entity 1031, the traffic cleaning function entity 1032, and the monitoring function entity 1033.

The BNG-UP device 102 sends the traffic of the terminal to the SFF 105. The SFF 105 receives the traffic, and sends the traffic to the address translation function entity 1031. The address translation function entity 1031 performs address translation processing on the traffic based on the address translation function, and sends the processed traffic to the SFF 105. The SFF 105 receives the traffic, and sends the traffic to the traffic cleaning function entity 1032. The traffic cleaning function entity 1032 performs cleaning processing on the traffic based on the traffic cleaning function, and sends the processed traffic to the SFF 105. The SFF 105 receives the traffic, and sends the traffic to the monitoring function entity 1033. The monitoring function entity 1033 performs monitoring processing on the traffic based on the monitoring function, and sends the processed traffic to the SFF 105. The SFF 105 receives the traffic and sends the traffic to a network.

Refer to FIG. 4. The network architecture 100 further includes a server 106, and the BNG-CP device 101 communicates with the server 106. The server 106 is configured to store a first correspondence, where each record in the first correspondence includes terminal information of one terminal and an identifier of one or more service functions to which a user corresponding to the terminal subscribes with an operator. Terminal information of the terminal includes one or more of the identifier of the terminal, a location of the terminal, and account information corresponding to the terminal. The identifier of the terminal includes one or more of an address of the terminal, an identifier of a virtual local area network (VLAN), and the like. The address of the terminal includes one or more of an internet protocol (IP) address, a media access control (MAC) address, and the like of the terminal.

In some embodiments, the server 106 includes a Radius server or the like.

For example, a first correspondence is shown in the following Table 1. A first record of the first correspondence includes terminal information of one terminal and identifiers of two service functions to which a user corresponding to the terminal subscribes with an operator, and the identifiers of the two service functions are respectively "V-ID1" and "V-ID2". A second record of the first correspondence includes account information of another terminal and an identifier of a service function to which a user corresponding to the another terminal subscribes with an operator, and the identifier of the service function is "V-ID2". "V-ID1" is an identifier corresponding to the traffic cleaning function, and "V-ID2" is an identifier corresponding to the monitoring function.

TABLE 1

| Sequence number | Terminal information | Identifier of a service function | Description |
|---|---|---|---|
| 1 | U-ID1 | V-ID1, V-ID2 | "V-ID1" is an identifier corresponding to a traffic cleaning function, and "V-ID2" is an identifier corresponding to a monitoring function |
| 2 | U-ID2 | V-ID2 | "V-ID2" is the identifier corresponding to the monitoring function |
| . . . | . . . | . . . | . . . |

For any terminal, an application may be further installed on the terminal. For the application, the user corresponding to the terminal may further subscribe to a service function corresponding to the application with the operator, and there is a record in the first correspondence. The record includes the terminal information of the terminal, application information of the application, and an identifier of the service function corresponding to the application. The application information of the application includes one or more of an identifier, a name, and the like of the application, and may further include one or more of a version of the application, a name of a manufacturer, an application type, and the like.

For example, the first correspondence is shown in the following Table 2. A first record in the first correspondence includes terminal information of one terminal, application information of an application installed on the terminal, and identifiers of two service functions that correspond to the application and to which a user corresponding to the terminal is subscribed with an operator, where the application information is an identifier "APP1" of the application, and the identifiers of the two service functions are respectively "V-ID1" and "V-ID2".

TABLE 2

| Sequence number | Terminal information | Application information | Identifier of a service function | Description |
|---|---|---|---|---|
| 1 | U-ID1 | APP1 | V-ID1, V-ID2 | "V-ID1" is an identifier corresponding to a traffic cleaning function, and "V-ID2" is an identifier corresponding to a monitoring function |
| 2 | U-ID2 | Empty | V-ID2 | "V-ID2" is the identifier corresponding to the monitoring function |
| . . . | . . . | . . . | . . . | . . . |

In the network architectures 100 shown in FIG. 1 to FIG. 4, when the terminal sends a packet to the BNG-UP device 102, the first service chain may be configured for the traffic of the terminal. The first service chain has one or more service functions. In this way, when receiving the traffic sent by the terminal, the BNG-UP device 102 sends the traffic to the first service chain. The first service chain may process the traffic based on the one or more service functions, to provide one or more services for the traffic. In this embodiment of this application, the one or more service functions may be configured according to the following embodiments.

Figure 5A:
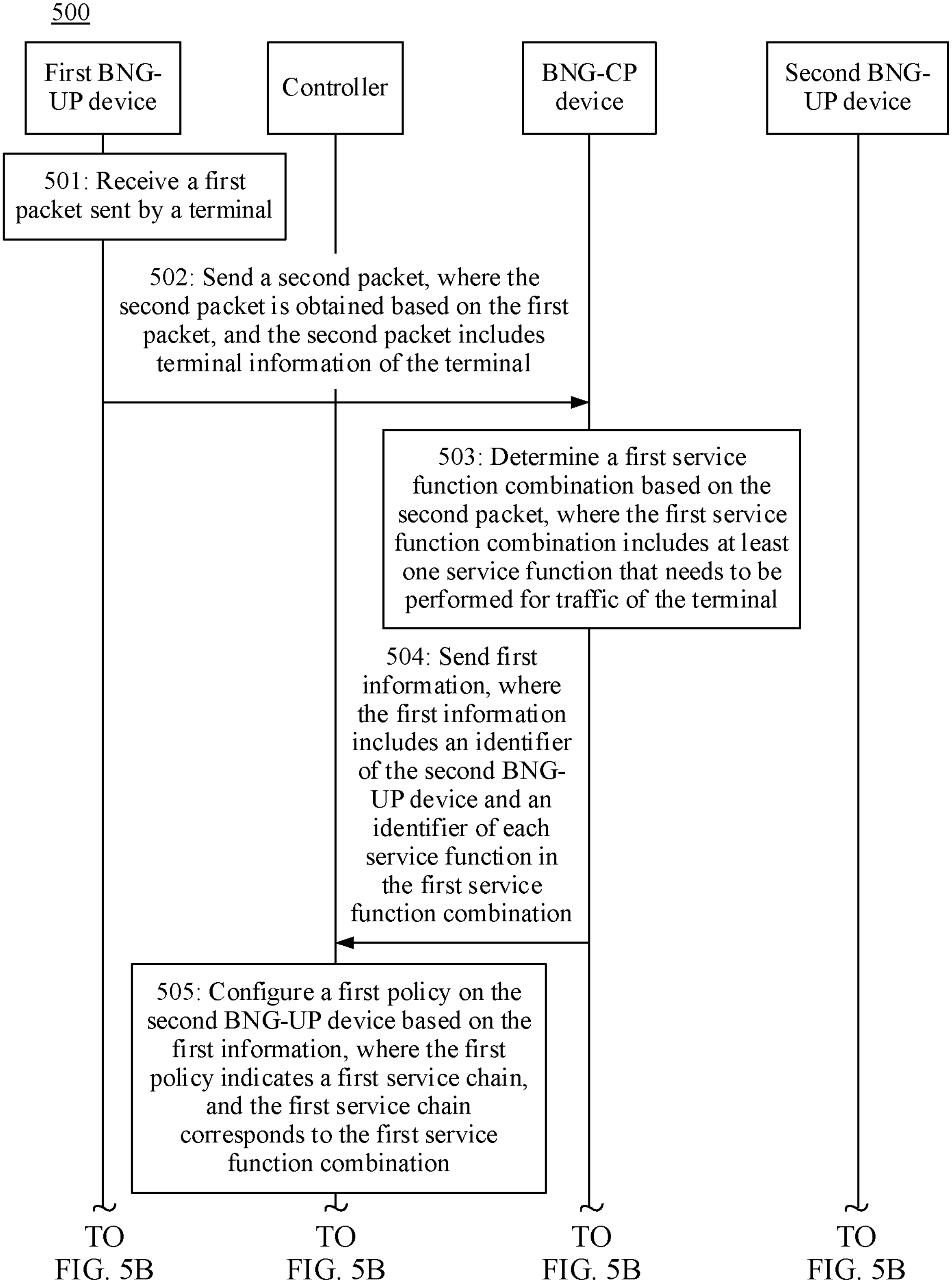
FIG. 5A and FIG. 5B are a flowchart of a traffic sending method according to an embodiment of this application.
Figure 5B:
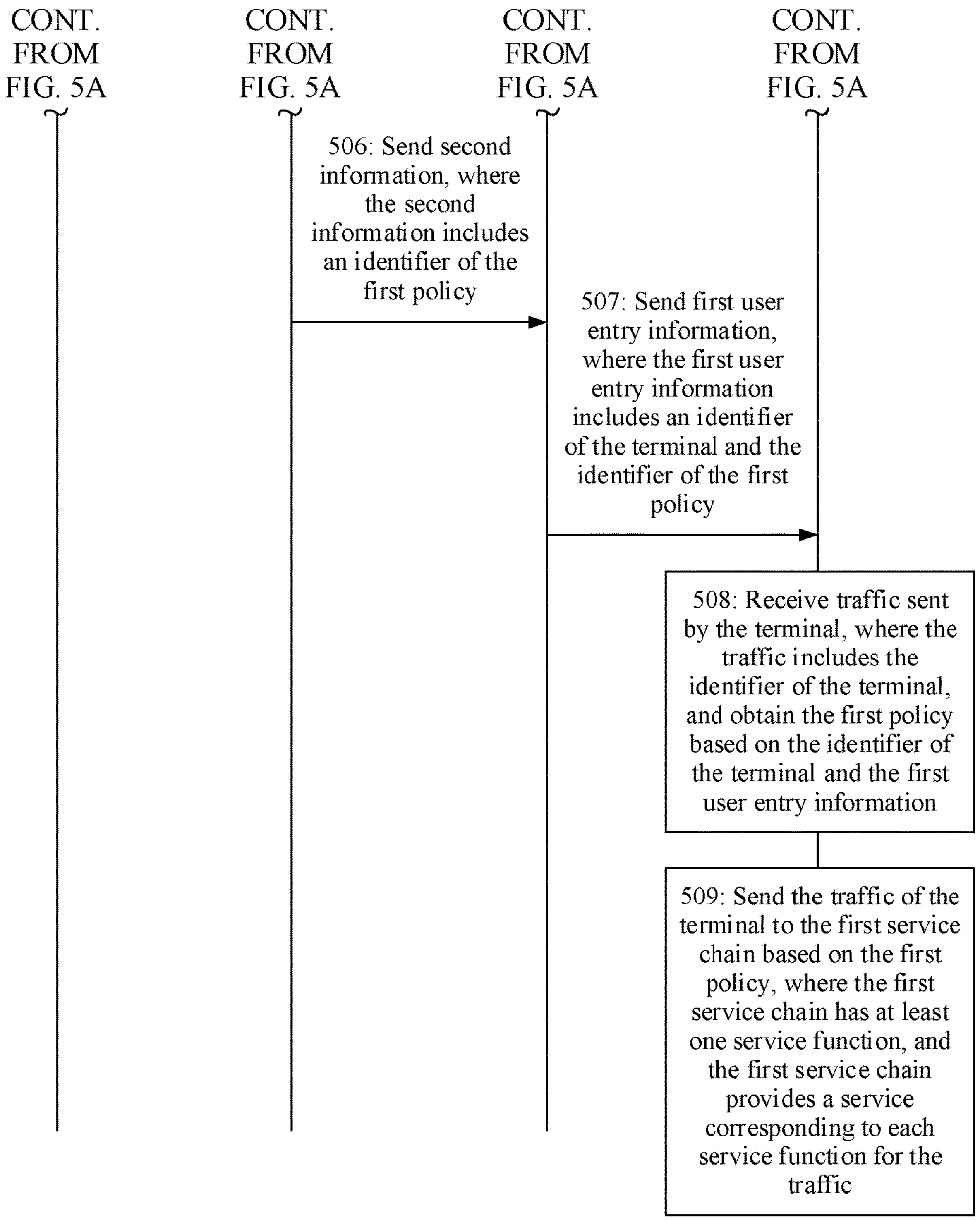

Refer to FIG. 5A and FIG. 5B. An embodiment of this application provides a traffic sending method 500. The method 500 is applied to the network architectures 100 shown in FIG. 1 to FIG. 4, and includes the following steps.

Step 501: A first BNG-UP device receives a first packet sent by a terminal.

In some embodiments, the first packet includes terminal information of the terminal.

When the terminal needs to send traffic, the terminal sends the first packet to the first BNG-UP device, to request to access the BNG-UP device and use the accessed BNG-UP device to send the traffic.

In some embodiments, the first packet includes a dialup packet, the dialup packet includes the terminal information of the terminal, and the terminal information includes one or more of an identifier of the terminal and account information corresponding to the terminal. When the dialup packet includes the account information, the terminal information further includes password information of the terminal, and the like.

In some embodiments, the dialup packet is a dynamic host configuration protocol (DHCP) discovery message, a point-to-point protocol over Ethernet (PPPoE) active discovery request (ADI) message, or the like.

In some embodiments, the first packet includes a data packet or an address resolution protocol (ARP) packet, the terminal is a terminal that obtains a static address, the data packet includes the identifier of the terminal, and the ARP packet includes the identifier of the terminal. An address of the terminal includes one or more of an IP address, a MAC address, and the like of the terminal, and the identifier includes the address of the terminal and/or an identifier of a VLAN.

For example, it is assumed that the account information of the terminal is "U-ID1", and the terminal sends a dialup packet to the first BNG-UP device, where the dialup packet includes the account information "U-ID1" of the terminal.

Step 502: The first BNG-UP device sends a second packet to a BNG-CP device, where the second packet is obtained based on the first packet, and the second packet includes the terminal information of the terminal.

In some embodiments, the first BNG-UP device adds location information of the terminal to the first packet, to obtain the second packet. Alternatively, the first BNG-UP device uses the first packet as the second packet.

The location information of the terminal is also a type of the terminal information. Therefore, the terminal information in the second packet includes one or more of the identifier of the terminal, the location information of the terminal, the account information corresponding to the terminal, and the like.

There may be a network connection between the first BNG-UP device and the BNG-CP device, and the first BNG-UP device sends the second packet to the BNG-CP device through the network connection.

The first BNG-UP device communicates with the BNG-CP device by using a state control interface (SCI), a control packet redirect interface (CPRi), and/or a management interface (MI). Therefore, the first BNG-UP device sends the second packet to the BNG-CP device by using the SCI, the CPRi, or the MI.

Step 503: The BNG-CP device receives the second packet, and determines a first service function combination based on the second packet, where the first service function combination includes at least one service function that needs to be performed for the traffic of the terminal.

In step 503, the first service function combination may be determined by performing the following operations 5031 to 5034, where the operations 5031 to 5034 are respectively as follows:

5031: The BNG-CP device receives the second packet, where the second packet includes the terminal information of the terminal, and sends a third packet to a server, where the third packet includes the terminal information.

In some embodiments, the third packet sent by the BNG-CP device to the server is an authentication request, and the authentication request includes the terminal information.

For example, the first BNG-UP device receives the dialup packet sent by the terminal, where the dialup packet includes the account information "U-ID1" of the terminal, and sends the dialup packet to the BNG-CP device. The BNG-CP device sends an authentication request to the server, where the authentication request includes the account information "U-ID1" of the terminal. The authentication request further includes password information of the terminal.

5032: The server receives the third packet, and determines the first service function combination based on the terminal information included in the third packet.

In 5032, the server obtains, based on the terminal information included in the third packet, an identifier of at least one service function from the first correspondence, where the at least one service function is a service function to which a user corresponding to the terminal is subscribed with an operator, and the first service function combination includes the at least one service function.

In a case in which the third packet is the authentication request, the server attempts to authenticate the terminal based on the authentication request, and when authentication succeeds, obtains the identifier of the at least one service function from the first correspondence based on the terminal information included in the third packet. The first correspondence includes a record that includes the terminal information and the identifier of the at least one service function. Therefore, the server finds the record from the first correspondence based on the terminal information, and the first service function combination includes a service function corresponding to an identifier of each service function in the record.

In some embodiments, the record further includes the application information of a first application, and the at least one service function in the record is the service function to which the user corresponding to the terminal is subscribed with the operator for the first application. Therefore, the application information of the first application is corresponding to the first service function combination.

In some embodiments, the first service function combination further includes a default service function.

In some embodiments, the third packet is an authentication request, and the authentication request includes the account information and the password information of the terminal. The server performs the following operations to attempt to authenticate the terminal.

The server queries a second correspondence for corresponding password information based on the account information included in the authentication request. Each record in the second correspondence includes account information and password information of one terminal. When the queried password information is the same as the password information included in the authentication request, the authentication succeeds; or when the queried password information is different from the password information included in the authentication request, the authentication fails.

For example, the server receives the authentication request, where the authentication request includes the account information "U-ID1" of the terminal, and the first correspondence shown in Table 1 includes a record including "U-ID1", service function identifiers "V-ID1", and "V-ID2". After the server authenticates the terminal based on the authentication request, the server queries, based on the account information "U-ID1", the first correspondence shown in Table 1 for the record. Therefore, the first service function combination includes the traffic cleaning function corresponding to "V-ID1" and the monitoring function corresponding to "V-ID2".

For another example, it is assumed that the first correspondence is shown in Table 2. The first correspondence shown in Table 2 includes a record including "U-ID1", service function identifiers "V-ID1" and "V-ID2", and application information "APP1" of the first application. After the server authenticates the terminal based on the authentication request, the server queries, based on the account information "U-ID1", the first correspondence shown in Table 2 for the record. Therefore, the first service function combination includes the traffic cleaning function corresponding to "V-ID1" and the monitoring function corresponding to "V-ID2", and the first service function combination corresponds to the application information "APP1" of the first application.

In addition, it is further assumed that the address translation function needs to be performed for the traffic of the terminal by default. Therefore, the first service function combination further includes the address translation function, and an identifier of the address translation function is "V-ID3". In other words, the first service function combination includes three service functions, and the three service functions are respectively the address translation function, the traffic cleaning function, and the monitoring function.

5033: The server sends a fourth packet to the BNG-CP device, where the fourth packet includes the identifier of each service function in the first service function combination.

When the server further obtains the application information of the first application corresponding to the first service function combination, the fourth packet further includes the application information of the first application.

In some embodiments, the fourth packet is an authentication response.

For example, the server sends the authentication response to the BNG-CP device, where the authentication response includes the identifier "V-ID3" of the address translation function, the identifier "V-ID1" of the traffic cleaning function, and the identifier "V-ID2" of the monitoring function in the first service function combination, or the authentication response includes the application information "APP1" of the first application, and the identifier "V-ID3" of the address translation function, the identifier "V-ID1" of the traffic cleaning function, and the identifier "V-ID2" of the monitoring function in the first service function combination.

5034: The BNG-CP device receives the fourth packet, and obtains the identifier of each service function in the first service function combination from the fourth packet.

When the fourth packet further includes the application information of the first application corresponding to the first service function combination, the BNG-CP device further obtains the application information of the first application from the fourth packet.

For example, the BNG-CP device receives the authentication response, and obtains, from the authentication response, the identifier "V-ID3" of the address translation function, the identifier "V-ID1" of the traffic cleaning function, and the identifier "V-ID2" of the monitoring function in the first service function combination. Alternatively, the BNG-CP device obtains, from the authentication response, the application information "APP1" of the first application, and the identifier "V-ID3" of the address translation function, the identifier "V-ID1" of the traffic cleaning function, and the identifier "V-ID2" of the monitoring function in the first service function combination.

Step 504: The BNG-CP device sends first information to the controller, where the first information includes an identifier of a second BNG-UP device and the identifier of each service function in the first service function combination, and the second BNG-UP device is a BNG-UP device accessed by the terminal.

The first BNG-UP device is a BNG-UP device selected by default when the terminal goes online. The second BNG-UP is a BNG-UP device to which subsequent traffic of the terminal is accessed. The first BNG-UP device and the second BNG-UP device may be a same device, or may be different devices. The BNG-CP device can obtain the identifier of the second BNG-UP device accessed by the terminal. For example, the BNG-CP device queries the identifier of the second BNG-UP device accessed by the terminal from another device, and/or the another device sends the identifier of the second BNG-UP device accessed by the terminal to the BNG-CP device.

In some embodiments, when the terminal is not a terminal that obtains a static address, after the BNG-CP device receives the authentication response sent by the server, the BNG-CP device further allocates an identifier to the terminal, where the identifier includes an address of the terminal and the like. The BNG-CP device further correspondingly stores the identifier of the terminal, the terminal information of the terminal, and the identifier of the second BNG-UP device in a third correspondence.

In some embodiments, when the fourth packet includes the application information of the first application, the first information further includes the application information of the first application.

In some embodiments, the first information further includes the identifier of the terminal.

In other words, the first information includes the identifier of the second BNG-UP device and the identifier of each service function in the first service function combination, and the first information may further include one or more of the application information of the first application, the identifier of the terminal, and the like.

For example, it is assumed that after receiving the authentication response sent by the server, the BNG-CP device allocates an identifier "IP1" to the terminal, and sends the first information to the controller, where the first information includes an identifier "IP2" of the second BNG-UP device, the identifier "V-ID3" of the address translation function in the first service function combination, the identifier "V-ID1" of a traffic cleaning function, and the identifier "V-ID2" of a listening function. The first information may further include one or more of the application information "APP1" of the first application and the identifier "IP1" of the terminal.

Step 505: The controller receives the first information, and configures a first policy on the second BNG-UP device based on the first information, where the first policy indicates a first service chain, and the first service chain corresponds to the first service function combination.

The first service chain includes at least one service function entity, and each service function entity is configured to implement one or more service functions in the first service function combination.

In step 505, the following two types of first policies are listed. Certainly, the first policy may alternatively be other types of policy. The other types of policies are not listed one by one in this embodiment of this application. The two types of first policies are respectively as follows:

Type 1: The first policy includes a first segment list, and the first segment list includes a segment identifier of the first service function combination.

In some embodiments, the first segment list includes a segment identifier of a service function entity corresponding to each service function in the first service function combination.

Type 2: The first policy includes information about a tunnel between the second BNG-UP device and a first SFF, and the first SFF is associated with the first service chain.

In step 505, the controller generates the first policy by performing the following operations 5051 to 5054, where the operations 5051 to 5054 are respectively as follows:

5051: The controller receives the first information, and generates the first policy based on the identifier of each service function in the first service function combination included in the first information.

The first policy is the policy of the type 1, and the first policy includes the first segment list. In this case, the controller obtains, based on the identifier of each service function in the first service function combination, the segment identifier of the service function entity corresponding to each service function, and generates a first segment list, where the first segment list includes the obtained segment identifier of each service function entity.

In some embodiments, when the first information includes the application information of the first application, the first policy further includes the application information of the first application.

In some embodiments, the controller obtains, from a fourth correspondence based on the identifier of each service function in the first service function combination, the segment identifier of the service function entity corresponding to each service function. Each record in the fourth correspondence includes an identifier of one service function and a segment identifier of a service function entity corresponding to the service function.

The fourth correspondence may be stored in the controller. The controller obtains, based on the identifier of each service function in the first service function combination, the segment identifier of the service function entity corresponding to each service function from the locally stored fourth correspondence. Alternatively, the fourth correspondence is stored in a storage device, and the controller obtains, from the fourth correspondence stored in the storage device based on the identifier of each service function in the first service function combination, the segment identifier of the service function entity corresponding to each service function. Optionally, the storage device is a storage server or the like.

For example, the fourth correspondence may be shown in Table 3. The first record in the fourth correspondence includes the identifier "V-ID3" of the address translation function and a segment identifier "SID1" of the address translation function, the second record includes the identifier "V-ID1" of the traffic cleaning function and a segment identifier "SID2" of the traffic cleaning function, and the third record includes the identifier "V-ID2" of the monitoring function and a segment identifier "SID5" of the monitoring function.

TABLE 3

| Sequence number | Identifier of a service function | Segment identifier of a service function |
|---|---|---|
| 1 | V-ID3 | SID1 |
| 2 | V-ID2 | SID2 |
| 3 | V-ID3 | SID3 |
| . . . | . . . | . . . |

The controller receives the first information, where the first information includes the identifier "IP2" of the second BNG-UP device, and the identifier "V-ID3" of the address translation function, the identifier "V-ID1" of the traffic cleaning function, and the identifier "V-ID2" of the monitoring function in the first service function combination. Based on the identifier "V-ID3" of the address translation function, the identifier "V-ID1" of the traffic cleaning function, and the identifier "V-ID2" of the monitoring function, the controller obtains, from the fourth correspondence shown in Table 3, the segment identifier "SID1" of the address translation function entity corresponding to the address translation function, the segment identifier "SID2" of the traffic cleaning function entity corresponding to the traffic cleaning function, and the segment identifier "SID3" of the monitoring function entity corresponding to the monitoring function.

The controller generates a first segment list, where the first segment list includes the segment identity "SID1" of the address translation function entity, the segment identity "SID2" of the traffic cleaning function entity, and the segment identity "SID3" of the monitoring function entity, and the first segment list may be represented as [SID1, SID2, SID3]. In this way, the first policy is obtained, where the first policy includes the first segment list [SID1, SID2, SID3].

In a case in which the first information includes the application information "APP1" of the first application, the first policy further includes the application information "APP1" of the first application. Therefore, the first policy may be represented as {the application information "APP1" of the first application, the first segment list [SID1, SID2, SID3]}.

When the first policy is a policy of the type 2, the first information further includes the identifier of the terminal in addition to the identifier of the second BNG-UP device and the identifier of each service function in the first service function combination. The first policy includes the information about the tunnel between the second BNG-UP device and the first SFF.

In some embodiments, the information about the tunnel includes an identifier of the first SFF and the like.

In this case, the controller selects at least one SFF, and obtains, based on the identifier of each service function in the first service function combination, the identifier of the service function entity corresponding to each service function. For each SFF in the at least one SFF, one or more corresponding service function entities are selected for each SFF from the service function entity corresponding to each service function in the first service function combination. The first policy is generated, where the first policy includes the information about the tunnel between the second BNG-UP device and the first SFF, and the first SFF corresponds to a service function entity corresponding to a first service function in the first service function combination.

At least one piece of first routing information is generated for each SFF, where for each SFF, the SFF corresponds to at least one service function entity, and the at least one piece of first routing information is in a one-to-one correspondence with the at least one service function entity. For first routing information corresponding to any service function entity, the first routing information includes an identifier of the service function entity and the identifier of a terminal.

The SFF is not the last SFF in the at least one SFF, that is, a next SFF after the SFF exists in the at least one SFF. The SFF further includes second routing information, and the second routing information includes the identifier of the terminal and an identifier of the next SFF.

In some embodiments, a policy of selecting an SFF by the controller includes: selecting at least one SFF with smallest load, selecting at least one SFF closest to the second BNG-UP device, or the like.

In some embodiments, when the first information includes the application information of the first application, the first policy further includes the application information of the first application, each piece of generated first routing information further includes the application information of the first application, and each piece of second routing information further includes the application information of the first application.

In some embodiments, the controller obtains, from a fifth correspondence based on the identifier of each service function in the first service function combination, the identifier of the service function entity corresponding to each service function. Each record in the fifth correspondence includes an identifier of one service function and an identifier of a service function entity corresponding to the service function.

In some embodiments, the identifier of the service function entity includes an address of the service function entity and the like.

The fifth correspondence may be stored in the controller. The controller obtains, based on the identifier of each service function in the first service function combination, the identifier of the service function entity corresponding to each service function from the locally stored fifth correspondence. Alternatively, the fifth correspondence is stored in a storage device, and the controller obtains, from the fourth correspondence stored in the storage device based on the identifier of each service function in the first service function combination, the identifier of the service function entity corresponding to each service function.

For example, the fifth correspondence may be shown in Table 4. The first record in the fifth correspondence includes the identifier "V-ID3" of the address translation function and an identifier "V-IP1" of the address translation function entity, the second record includes the identifier "V-ID1" of the traffic cleaning function and an identifier "V-IP2" of the traffic cleaning function entity, and the third record includes the identifier "V-ID2" of the monitoring function and an identifier "V-IP3" of the monitoring function entity.

TABLE 4

| Sequence number | Identifier of a service function | Identifier of a service function entity |
|---|---|---|
| 1 | V-ID3 | V-IP1 |
| 2 | V-ID2 | V-IP2 |
| 3 | V-ID3 | V-IP3 |
| . . . | . . . | . . . |

The controller receives the first information, where the first information includes the identifier "IP2" of the second BNG-UP device, the identifier "IP1" of the terminal, and the identifier "V-ID3" of the address translation function, the identifier "V-ID1" of the traffic cleaning function, and the identifier "V-ID2" of the monitoring function in the first service function combination. The controller selects an SFF as the first SFF. Assuming that the identifier of the first SFF is "IP3", based on the identifier "V-ID3" of the address translation function, the identifier "V-ID1" of the traffic cleaning function, and the identifier "V-ID2" of the monitoring function, the identifier "V-IP1" of the address translation function entity corresponding to the address translation function, the identifier "V-IP2" of the traffic cleaning function entity corresponding to the traffic cleaning function, and the identifier "V-IP3" of the monitoring function entity corresponding to the monitoring function can be obtained from the fifth correspondence shown in Table 4. The first policy is generated, where the first policy includes the information about the tunnel between the second BNG-UP device and the first SFF, and the information may include the identifier "IP3" of the first SFF. First routing information 1, first routing information 2, and first routing information 3 are generated, where the first routing information 1 corresponds to the address translation function entity, and includes the identifier "IP1" of the terminal and an address "V-IP1" of the address translation function entity, which may be represented as <IP1, V-IP1>; the first routing information 2 corresponds to the traffic cleaning function entity, and includes the identifier "IP1" of the terminal and the identifier "V-IP2" of the traffic cleaning function entity, which may be represented as <IP1, V-IP2>; and the first routing information 3 corresponds to the monitoring function, and includes the identifier "IP1" of the terminal and the identifier "V-IP3" of the monitoring function entity, and may be represented as <IP1, V-IP3>.

For another example, the controller selects two SFFs: the first SFF and a second SFF. Assuming that the identifier of the first SFF is "IP3", and an identifier of the second SFF is "IP4", based on the identifier "V-ID3" of the address translation function, the identifier "V-ID1" of the traffic cleaning function, and the identifier "V-ID2" of the monitoring function, the identifier "V-IP1" of the address translation function entity corresponding to the address translation function, the identifier "V-IP2" of the traffic cleaning function entity corresponding to the traffic cleaning function, and the identifier "V-IP3" of the monitoring function entity corresponding to the monitoring function can be respectively obtained from the fifth correspondence shown in Table 4. The address translation function entity is allocated to the first SFF, and the traffic cleaning function entity and the listening function entity are allocated to the second SFF. The first policy is generated, where the first policy includes the information about the tunnel between the second BNG-UP device and the first SFF, and the information may include the identifier "IP3" of the first SFF. First routing information 1 and second routing information are generated for the first SFF, and first information 2 and first information 3 are generated for the second SFF, where the first routing information 1 corresponds to the address translation function entity, and includes the identifier "IP1" of the terminal and an address "V-IP1" of the address translation function entity, which may be represented as <IP1, V-IP1>; the second routing information includes the identifier "IP1" of the terminal and the identifier "IP4" of the second SFF, which may be represented as <IP1, IP4>; the first routing information 2 corresponds to the traffic cleaning function entity, and includes the identifier "IP1" of the terminal and the identifier "V-IP2" of the traffic cleaning function entity, which may be represented as <IP1, V-IP2>; and the first routing information 3 corresponds to the monitoring function, and includes the identifier "IP1" of the terminal and the identifier "V-IP3" of the monitoring function entity, and may be represented as <IP1, V-IP3>.

In addition, when the first information includes the application information "APP1" of the first application, the first policy includes the identifier "IP3" of the first SFF and the application information "APP1" of the first application, which is represented as <the identifier "IP3" of the first SFF, the application information "APP1" of the first application>. The first routing information 1 further includes the application information "APP1" of the first application, which is represented as <IP1, APP1, V-IP1>. The first routing information 2 further includes the application information "APP1" of the first application, which is represented as <IP1, APP1, V-IP2>. The first routing information 3 further includes the application information "APP1" of the first application, which is represented as <IP1, APP1, V-IP3>. The second routing information further includes the application information of the first application, which is represented as <IP1, APP1, IP4>.

5052: The controller sends the first policy to the second BNG-UP device based on the identifier of the second BNG-UP device included in the first information.

When the first policy is a policy of the type 1, that is, the first policy includes the first segment list, or includes the first segment list and the application information of the first application, the controller sends the first policy to the second BNG-UP device based on the identifier of the second BNG-UP device included in the first information, that is, sends the first segment list to the second BNG-UP device, or sends the first segment list and the application information of the first application.

For example, the first policy is {first segment list [SID1, SID2, SID3]}, or the first policy is {application information "APP1" of the first application, first segment list [SID1, SID2, SID3]}. The controller sends {first segment list [SID1, SID2, SID3]} or {application information "APP1" of the first application, first segment list [SID1, SID2, SID3]} to the second BNG-UP device based on the identifier "IP2" of the second BNG-UP device included in the first information.

When the first policy is a policy of the type 2, the first policy includes the identifier of the first SFF, or includes the identifier of the first SFF and the application information of the first application. The controller sends the first policy to the second BNG-UP device based on the identifier of the second BNG-UP device included in the first information, and for each SFF in the at least one SFF, sends, to the SFF based on the identifier of the SFF, at least one piece of first routing information corresponding to the SFF. If the SFF further has corresponding second routing information, the controller further sends the second routing information to the SFF. The SFF receives and stores the at least one piece of first routing information, and/or receives and stores the second routing information.

For example, it is assumed that the controller selects an SFF, that is, selects the first SFF. The first policy includes the identifier "IP3" of the first SFF, and the first routing information 1 corresponding to the first SFF is <IP1, V-IP1>, the first routing information 2 corresponding to the first SFF is <IP1, V-IP2>, and the first routing information 3 corresponding to the first SFF is <IP1, V-IP3>. The controller sends, based on the identifier "IP2" of the second BNG-UP device included in the first information, the identifier "IP3" of the first SFF included in the first policy to the second BNG-UP device, and sends, based on the identifier "IP3" of the first SFF, the first routing information 1<IP1, V-IP1>, the first routing information 2<IP1, V-IP2>, and the first routing information 3<IP1, V-IP3> to the first SFF. Alternatively, the first policy includes the identifier "IP3" of the first SFF and the application information "APP1" of the first application, the first policy is represented as <address "IP3" of the SFF, application information "APP1" of the first application>, the first routing information 1 is <IP1, APP1, V-IP1>, the first routing information 2 is <IP1, APP1, V-IP2>, and the first routing information 3 is <IP1, APP1, V-IP3>. The controller sends <address of the SFF "IP3", application information "APP1" of the first application> to the second BNG-UP device based on the identifier "IP2" of the second BNG-UP device included in the first information, and sends the first routing information 1<IP1, APP1, V-IP1>, the first routing information 2<IP1, APP1, V-IP2>, and the first routing information 3<IP1, APP1, V-IP3> to the first SFF based on the identifier "IP3" of the first SFF.

For another example, it is assumed that the controller selects two SFFs: the first SFF and the second SFF. The first policy includes the identifier "IP3" of the first SFF, the first routing information 1 corresponding to the first SFF is <IP1, V-IP1>, and the second routing information corresponding to the first SFF is <IP1, IP4>, the first information 2 corresponding to the second SFF is <IP1, V-IP2>, and the first routing information 3 corresponding to the second SFF is <IP1, V-IP3>. The controller sends, based on the identifier "IP2" of the second BNG-UP device included in the first information, the identifier "IP3" of the first SFF included in the first policy to the second BNG-UP device. The first routing information 1<IP1, V-IP1> and the second routing information <IP1, IP4> are sent to the first SFF based on the identifier "IP3" of the first SFF. The first routing information 2<IP1, V-IP2> and the first routing information 3 <IP1, V-IP3> are sent to the second SFF based on the identifier "IP4" of the second SFF. Alternatively, the first policy includes the identifier "IP3" of the first SFF and the application information "APP1" of the first application, the first policy is represented as <address "IP3" of the SFF, application information "APP1" of the first application>, the first routing information 1 is <IP1, APP1, V-IP1>, the first routing information 2 is <IP1, APP1, V-IP2>, and the first routing information 3 is <IP1, APP1, V-IP3>. The controller sends <address of the SFF "IP3", application information "APP1" of the first application> to the second BNG-UP device based on the identifier "IP2" of the second BNG-UP device included in the first information, and sends the first routing information 1<IP1, APP1, V-IP1>, and the second routing information <IP1, APP1, IP4> to the first SFF based on the identifier "IP3" of the first SFF. The controller sends the first routing information 2<IP1, APP1, V-IP2> and the first routing information 3<IP1, APP1, V-IP3> to the second SFF based on the identifier "IP4" of the second SFF.

For each SFF, the SFF receives the first routing information and/or second routing information, and stores the received first routing information and/or second routing information. For example, the received first routing information and/or second routing information is stored in a routing table.

5053: The second BNG-UP device receives the first policy, and sends a configuration success message to the controller.

When the first policy is a policy of the type 1, the first policy includes the first segment list, or includes the first segment list and the application information of the first application. The second BNG-UP device receives the first policy, and stores the first policy, that is, stores the first segment list, or stores the first segment list and the application information of the first application.

For example, the first policy is {first segment list [SID1, SID2, SID3]}, or the first policy is {application information "APP1" of the first application, first segment list [SID1, SID2, SID3]}. The second BNG-UP device receives and stores {the first segment list [SID1, SID2, SID3]} or {application information "APP1" of the first application, first segment list [SID1, SID2, SID3]}.

When the first policy is a policy of the type 2, the second BNG-UP device receives and stores the first policy, where the first policy includes the identifier of the first SFF; and establishes a tunnel between the second BNG-UP device and the first SFF based on the identifier of the first SFF.

For example, the first policy includes the address "IP3" of the first SFF, and the second BNG-UP device receives the first policy, and establishes the tunnel between the second BNG-UP device and the first SFF based on "IP3" in the first policy.

5054: The controller receives the configuration success message, to determine that the first policy is successfully configured.

In some embodiments, information is transmitted between the second BNG-UP device and the controller by using a first network transmission protocol. To be specific, the controller sends the first policy to the second BNG-UP device by using the first network transmission protocol, and the second BNG-UP device sends the configuration success message to the controller by using the first network transmission protocol.

The first network transmission protocol includes a network configuration protocol (Netconf), a data modeling language (yet another next generation (YANG)), a path computation element communication protocol (PCEP), a border gateway protocol link state (BGP-LS), or the like.

Step 506: The controller sends second information to the BNG-CP device, where the second information includes an identifier of the first policy.

The identifier of the first policy may be an information identifier allocated by the controller, and is used to uniquely identify the first policy in the second BNG-UP device.

In some embodiments, information is transmitted between the BNG-CP device and the controller by using a second network transmission protocol. To be specific, the BNG-CP device sends the first information to the controller by using the second network transmission protocol, and the controller sends the second information to the BNG-CP device by using the second network transmission protocol.

The second network transmission protocol includes NETCONF, YANG, or the like.

Step 507: The BNG-CP device receives the second information, and sends first user entry information to the second BNG-UP device, where the first user entry information includes the identifier of the terminal and the identifier of the first policy.

The first user entry information indicates the second BNG-UP device to send the traffic of the terminal to the first service chain by using the first policy. The second BNG-UP device receives and stores the first user entry information.

The BNG-CP device sends the first user entry information to the second BNG-UP device by using SCI, CPRi, or MI.

For example, the second information received by the BNG-CP device includes an identifier "SR1" of the first policy, and the first user entry information is sent to the second BNG-UP device. The first user entry information includes the identifier "IP1" of the terminal and the identifier "SR1" of the first policy.

In some embodiments, when the controller is integrated into the BNG-CP device, the BNG-CP device has a function of the controller. In this case, after obtaining the first service function combination, the BNG-CP device directly generates the first policy, and sends the first policy to the second BNG-UP device. For a process of generating the first policy and sending the first policy, refer to the foregoing process of 5051 to 5054, and details are not described herein again.

When the first packet is a dialup packet, the BNG-CP device indicates the second BNG-UP device or the first BNG-UP device to send a dialup response to the terminal, where the dialup response includes the identifier of the terminal and the identifier of the second BNG-UP device. The terminal receives the dialup response, and then sends the traffic to the second BNG-UP device based on the identifier of the terminal. Alternatively, when the first packet is an ARP packet, the BNG-CP device indicates the first BNG-UP device or the second BNG-UP device to send an ARP response packet to the terminal, and the terminal receives the ARP response packet, and then sends the traffic to the second BNG-UP device based on the identifier of the terminal. Alternatively, when the first packet is a data packet, where the data packet is a packet in the traffic sent by the terminal, the first BNG-UP device may be the second BNG-UP device accessed by the terminal, and the second BNG-UP device sends the traffic to the first service chain. A specific implementation process includes the following steps.

Step 508: The second BNG-UP device receives the traffic sent by the terminal, where the traffic includes the identifier of the terminal, and obtains the first policy based on the identifier of the terminal and the first user entry information.

The second BNG-UP device receives the traffic sent by the terminal, extracts the identifier of the terminal from the traffic, and obtains, from stored user entry information, the first user entry information including the identifier of the terminal. The first user entry information further includes the identifier of the first policy, and the stored first policy is obtained based on the identifier of the first policy.

For example, the second BNG-UP device receives the traffic sent by the terminal, and a source address of the traffic is the identifier "IP1" of the terminal. The first user entry information including "IP1" is obtained from the stored user entry information. The first user entry information further includes the identifier "SR1" of the first policy, and the first policy is obtained based on the identifier "SR1" of the first policy, where the first policy includes the first segment list [SID1, SID2, SID3], or the first policy includes the identifier "IP3" of the first SFF.

In some embodiments, the traffic further includes the application information of the first application, the first application is an application installed on the terminal, and the traffic is traffic that is sent by the terminal and that belongs to the first application. The second BNG-UP device obtains, from the stored user entry information, at least one piece of user entry information that includes the identifier of the terminal, where each piece of obtained user entry information further includes an identifier of a policy. Each corresponding policy is obtained based on the identifier of the policy included in each piece of obtained user entry information, and the first policy including the application information of the first application is selected from the policy.

For example, the traffic received by the second BNG-UP device includes the application information "APP1" of the first application and the identifier "IP1" of the terminal, and the traffic is the traffic that is sent by the terminal and that belongs to the first application. The user entry information including "IP1" is obtained from the stored user entry information, and the obtained user entry information further includes an identifier "SR1" of a policy. The corresponding policy is obtained based on the identifier "SR1" of the policy. The obtained policy includes the identifier "IP3" of the first SFF and the application information "APP1" of the first application, which is <address "IP3" of the SFF, application information "APP1" of the first application>; or includes the application information "APP1" of the first application and the first segment list, which is {application information "APP1" of the first application, first segment list [SID1, SID2, SID3]}. The first policy including the application information "APP1" of the first application is selected from the obtained policy, and the selected first policy is <address "IP3" of the SFF, application information "APP1" of the first application> or {application information "APP1" of the first application, first segment list [SID1, SID2, SID3]}.

Step 509: The second BNG-UP device sends the traffic of the terminal to the first service chain based on the first policy, where the first service chain has at least one service function, and the first service chain provides a service corresponding to each service function for the traffic.

When the first policy is a policy of the type 1, the first policy includes the first segment list. For any packet included in the traffic, for ease of description, the packet is referred to as a fifth packet. The BNG-UP device adds a packet header to the fifth packet, where the packet header includes the first segment list, to obtain a sixth packet, and sends the sixth packet. Optionally, the header is a segment routing internet protocol version 6 header (SRH), and the like.

An operation of sending the sixth packet is as follows: The second BNG-UP device obtains the first segment identifier from the first segment list, and sends the sixth packet to a service function entity corresponding to the first segment identifier. The service function entity receives the sixth packet, processes the sixth packet based on the service function included in the service function entity, to provide a service corresponding to the service function for the sixth packet, obtains a next segment identifier from the first segment list of the sixth packet, and sends the sixth packet to a service function entity corresponding to the next segment identifier. For a service function entity corresponding to the last segment identifier in the first segment list, the service function entity receives the sixth packet, processes the sixth packet based on the service function included in the service function entity, to provide a service corresponding to the service function for the sixth packet, removes the added packet header from the sixth packet to obtain the fifth packet, and sends the fifth packet.

In some embodiments, the fifth packet is sent to a network. The network includes a backbone network, a core network, and/or the like.

For example, the first segment list included in the obtained first policy is [SID1, SID2, SID3]. For the fifth packet included in the traffic received by the second BNG-UP device, a packet header is added to the fifth packet, and the packet header includes the first segment list [SID1, SID2, SID3], to obtain the sixth packet. The first segment identifier SID1 is obtained from a first segment queue, and the sixth packet is sent to the address translation function entity corresponding to the SID1. The address translation function entity receives the sixth packet, performs address translation processing on the sixth packet based on the address translation function included in the address translation function entity, to provide the address translation service corresponding to the address translation function for the sixth packet, obtains a next segment identifier from the first segment list of the sixth packet, where the next segment identifier is SID2, and sends the sixth packet on which address translation processing is performed to the traffic cleaning function entity corresponding to SID2.

The traffic cleaning function entity receives the sixth packet, performs cleaning processing on the sixth packet based on the traffic cleaning function included in the traffic cleaning function entity to provide the cleaning service corresponding to the traffic cleaning function for the sixth packet, obtains a next segment identifier from the first segment list of the sixth packet, where the next segment identifier is SID3, and sends the sixth packet on which cleaning processing is performed to the monitoring function entity corresponding to SID3.

The monitoring function entity receives the sixth packet, and performs monitoring processing on the sixth packet based on the monitoring function included in the monitoring function entity, to provide the monitoring service corresponding to the monitoring function for the sixth packet. The added packet header is removed from the second packet to obtain the fifth packet, and the fifth packet is sent.

When the first policy is a policy of the type 2, the first policy includes the identifier of the first SFF. For the fifth packet included in the traffic received by the second BNG-UP device, the second BNG-UP device determines a tunnel between the second BNG-UP device and the first SFF based on the identifier of the first SFF included in the first policy, and sends the fifth packet to the first SFF through the determined tunnel. The first SFF receives the fifth packet, where the first SFF is associated with the first service chain, and the first service chain includes at least one service function entity corresponding to the first SFF; and sends the fifth packet to one service function entity in the at least one service function entity. The service function entity receives the fifth packet, processes the fifth packet based on a service function included in the service function entity, and sends the processed fifth packet to the first SFF. The first SFF receives the processed fifth packet, and sends the fifth packet to a service function entity corresponding to another service function in the same manner as the foregoing. When the first SFF receives the fifth packet returned by the last service function entity in the at least one service function entity, the first SFF sends the fifth packet.

The first SFF sends the fifth packet to the second SFF. The second SFF is another SFF associated with the first service chain, and the second SFF performs a same operation as the first SFF. Alternatively, the first SFF sends the fifth packet to a network.

For the first SFF or the second SFF, when receiving the fifth packet, the first SFF (the second SFF) obtains, based on the identifier of the terminal included in the fifth packet, at least one piece of first routing information including the identifier. The first piece of first routing information is selected from the at least one piece of first routing information, and the fifth packet is sent, based on an identifier of a service function entity included in the first piece of first routing information, to the service function entity. When receiving the fifth packet returned by the service function entity, the first SFF (the second SFF) repeats the foregoing process until the first SFF sends, based on an identifier of a service function entity included in the last piece of first routing information, a first packet to the service function entity, and sends the fifth packet when receiving the fifth packet returned by the service function entity.

If the first SFF (the second SFF) includes the second routing information including the identifier of the terminal, the fifth packet is sent to the SFF based on the identifier of the SFF included in the second routing information. If the first SFF (the second SFF) does not include the second routing information including the identifier of the terminal, the fifth packet is sent to the network.

For example, the SFF associated with the first service chain includes the first SFF, and the first SFF includes the first routing information 1, the first routing information 2, and the first routing information 3. The first routing information 1 is <IP1, V-IP1>, the first routing information 2 is <IP1, V-IP2>, and the first routing information 3 is <IP1, V-IP3>. For the fifth packet included in the traffic received by the second BNG-UP device, the second BNG-UP device sends the fifth packet to the first SFF based on the identifier "IP3" of the first SFF included in the first policy.

The first SFF receives the fifth packet, and obtains, based on the identifier "IP1" of the terminal included in the fifth packet, the first routing information 1, the first routing information 2, and the first routing information 3 that include "IP1". The first packet is sent to the address translation function entity based on the identifier "V-IP1" of the address translation function entity included in the first routing information 1. The address translation function entity receives the first packet, performs address translation processing on the first packet based on the address translation function included in the address translation function entity, to provide the address translation service corresponding to the address translation function for the fifth packet, and sends, to the first SFF, the fifth packet on which the address translation processing is performed.

The first SFF receives the fifth packet on which address translation is performed, and sends the fifth packet to the traffic cleaning function entity based on the identifier "V-IP2" of the traffic cleaning function entity included in the first routing information 2. The traffic cleaning function entity receives the fifth packet, performs cleaning processing on the fifth packet based on the traffic cleaning function included in the traffic cleaning function entity, to provide the cleaning service corresponding to the cleaning function for the fifth packet, and sends, to the first SFF, the fifth packet on which cleaning processing is performed.

The first SFF receives the fifth packet on which cleaning processing is performed, and sends the fifth packet to the monitoring function entity based on the identifier "V-IP3" of the monitoring function entity included in the first routing information 3. The monitoring function entity receives the fifth packet, performs monitoring processing on the fifth packet based on the monitoring function included in the monitoring function entity, to provide the monitoring service corresponding to the monitoring function for the fifth packet, and sends, to the first SFF, the fifth packet on which monitoring processing is performed.

The first SFF receives the fifth packet on which monitoring processing is performed. Because the first routing information 3 is the last piece of obtained routing information, that is, the monitoring function entity is a service function entity corresponding to the last service function in the first service chain, the fifth packet is sent to the network.

For another example, the SFF associated with the first service chain includes the first SFF and the second SFF, the first SFF includes the first routing information 1 and the second routing information, and the second SFF includes the first routing information 2 and the first routing information 3. The first routing information 1 is <IP1, V-IP1>, the first routing information 2 is <IP1, V-IP2>, the first routing information 3 is <IP1, V-IP3>, and the second routing information is <IP1, IP4>. For the fifth packet included in the traffic received by the second BNG-UP device, the second BNG-UP device sends the fifth packet to the first SFF based on the identifier "IP3" of the first SFF included in the first policy.

The first SFF receives the fifth packet, and obtains, based on the identifier "IP1" of the terminal included in the fifth packet, the first routing information 1 and the second routing information that include "IP1". The first packet is sent to the address translation function entity based on the identifier "V-IP1" of the address translation function entity included in the first routing information 1. The address translation function entity receives the first packet, performs address translation processing on the first packet based on the address translation function included in the address translation function entity, to provide the address translation service corresponding to the address translation function for the fifth packet, and sends, to the first SFF, the fifth packet on which the address translation processing is performed.

The first SFF receives the fifth packet on which address translation processing is performed, and sends the fifth packet to the second SFF based on the identifier "IP4" included in the second routing information. The second SFF receives the fifth packet, and obtains, based on the identifier "IP1" of the terminal included in the fifth packet, the first routing information 2 and the first routing information 3 that include "IP1".

The second SFF sends the fifth packet to the traffic cleaning function entity based on the identifier "V-IP2" of the traffic cleaning function entity included in the first routing information 2. The traffic cleaning function entity receives the fifth packet, performs traffic cleaning processing on the fifth packet based on the traffic cleaning function included in the traffic cleaning function entity, to provide the cleaning service corresponding to the cleaning function for the fifth packet, and sends the fifth packet on which cleaning processing is performed to the second SFF.

The second SFF receives the fifth packet on which cleaning processing is performed, and sends the fifth packet to the monitoring function entity based on the identifier "V-IP3" of the monitoring function entity included in the first routing information 3. The monitoring function entity receives the fifth packet, performs monitoring processing on the fifth packet based on the monitoring function included in the monitoring function entity, to provide the monitoring service corresponding to the monitoring function for the fifth packet, and sends the fifth packet on which monitoring processing is performed to the second SFF.

The second SFF receives the fifth packet on which monitoring processing is performed. Because the first routing information 3 is the last piece of obtained routing information, that is, the monitoring function entity is a service function entity corresponding to the last service function in the first service chain, the fifth packet is sent to the network.

In some embodiments, the fifth packet further includes the application information of the first application. The first SFF (the second SFF) receives the fifth packet, and obtains, based on the identifier of the terminal and the application information of the first application that are included in the fifth packet, the at least one piece of first routing information including the address and the application information. The first piece of first routing information is selected from the at least one piece of first routing information, and the fifth packet is sent, based on an identifier of a service function entity included in the first piece of first routing information, to the service function entity.

When receiving the fifth packet returned by the service function entity, the first SFF (the second SFF) repeats the foregoing process until the first SFF sends, based on an address of a service function entity included in the last piece of first routing information, the fifth packet to the service function entity, and sends the fifth packet to another SFF or network when receiving the fifth packet returned by the service function entity.

For example, the SFF associated with the first service chain includes the first SFF, and the first SFF includes the first routing information 1, the first routing information 2, and the first routing information 3. The first routing information 1 is <IP1, APP1, V-IP1>, the first routing information 2 is <IP1, APP1, V-IP2>, and the first routing information 3 is <IP1, APP1, V-IP3>.

The fifth packet received by the first SFF includes the application information "APP1" of the first application and the identifier "IP1" of the terminal, and the first routing information 1, the first routing information 2, and the first routing information 3 that include "IP1" and "APP1" are obtained based on the identifier "IP1" of the terminal and the application information "APP1" of the first application that are included in the fifth packet. The fifth packet is sent to the address translation function entity based on the identifier "V-IP1" of the address translation function entity included in the first routing information 1<IP1, APP1, V-IP1>. The address translation function entity receives the fifth packet, performs address translation processing on the fifth packet based on the address translation function included in the address translation function entity, to provide the address translation service corresponding to the address translation function for the fifth packet, and sends, to the first SFF, the fifth packet on which the address translation processing is performed.

The first SFF receives the fifth packet on which address translation is performed, and sends the fifth packet to the traffic cleaning function entity based on the identifier "V-IP2" of the traffic cleaning function entity included in the first routing information 2<IP1, APP1, V-IP2>. The traffic cleaning function entity receives the fifth packet, performs cleaning processing on the fifth packet based on the traffic cleaning function included in the traffic cleaning function entity, to provide the cleaning service corresponding to the cleaning function for the fifth packet, and sends, to the first SFF, the fifth packet on which cleaning processing is performed.

The first SFF receives the fifth packet on which cleaning processing is performed, and sends the fifth packet to the monitoring function entity based on the identifier "V-IP3" of the monitoring function entity included in the first routing information 3<IP1, APP1, V-IP2>. The monitoring function entity receives the fifth packet, performs monitoring processing on the fifth packet based on the monitoring function included in the monitoring function entity, to provide the monitoring service corresponding to the monitoring function for the fifth packet, and sends, to the first SFF, the fifth packet on which monitoring processing is performed.

The first SFF receives the fifth packet on which monitoring processing is performed. Because the first routing information 3 is the last piece of obtained routing information, that is, the monitoring function entity is the last service function entity in the first service chain, the fifth packet is sent to the network.

For another example, the SFF associated with the first service chain includes the first SFF and the second SFF, the first SFF includes the first routing information 1 and the second routing information, and the second SFF includes the first routing information 2 and the first routing information 3. The first routing information 1 is <IP1, APP1, V-IP1>, the first routing information 2 is <IP1, APP1, V-IP2>, the first routing information 3 is <IP1, APP1, V-IP3>, and the second routing information is <IP1, APP1, IP4>.

The fifth packet received by the first SFF includes the application information "APP1" of the first application and the identifier "IP1" of the terminal, and the first routing information 1 and the second routing information that include "IP1" and "APP1" are obtained based on the identifier "IP1" of the terminal and the application information "APP1" of the first application that are included in the fifth packet. The fifth packet is sent to the address translation function entity based on the identifier "V-IP1" of the address translation function entity included in the first routing information 1<IP1, APP1, V-IP1>. The address translation function entity receives the fifth packet, performs address translation processing on the fifth packet based on the address translation function included in the address translation function entity, to provide the address translation service corresponding to the address translation function for the fifth packet, and sends, to the first SFF, the fifth packet on which the address translation processing is performed.

The first SFF receives the fifth packet on which address translation processing is performed, and sends the fifth packet to the second SFF based on the identifier "IP4" of the second SFF included in the second routing information <IP1, APP1, IP4>. The second SFF obtains the first routing information 2 and the first routing information 3 that include "IP1" and "APP1".

The second SFF sends the fifth packet to the traffic cleaning function entity based on the identifier "V-IP2" of the traffic cleaning function entity included in the first routing information 2<IP1, APP1, V-IP2>. The traffic cleaning function entity receives the fifth packet, performs traffic cleaning processing on the fifth packet based on the traffic cleaning function included in the traffic cleaning function entity, to provide the cleaning service corresponding to the cleaning function for the fifth packet, and sends the fifth packet on which cleaning processing is performed to the second SFF.

The second SFF receives the fifth packet on which cleaning processing is performed, and sends the fifth packet to the monitoring function entity based on the identifier "V-IP3" of the monitoring function entity included in the first routing information 3<IP1, APP1, V-IP2>. The monitoring function entity receives the fifth packet, performs monitoring processing on the fifth packet based on the monitoring function included in the monitoring function entity, to provide the monitoring service corresponding to the monitoring function for the fifth packet, and sends the fifth packet on which monitoring processing is performed to the second SFF.

The second SFF receives the fifth packet on which monitoring processing is performed. Because the first routing information 3 is the last piece of obtained routing information, that is, the monitoring function entity is the last service function entity in the first service chain, the fifth packet is sent to a core network.

For the service function entity in the first service chain, after processing the traffic of the terminal based on the service function, the service function entity further sends a processing result to the BNG-CP device. For example, for the address translation function entity, after translating the address of the packet, the address translation function entity sends log information to the BNG-CP device. The log information includes the address of the terminal and the source address of the packet obtained after translation.

In this embodiment of this application, when receiving the packet sent by the first BNG-UP device, the BNG-CP device determines the first service function combination based on the terminal information included in the packet, and sends the identifier of each service function in the first service function combination to the controller. The controller configures the first policy on the second BNG-UP device based on the identifier of each service function in the first service function combination, where the second BNG-UP device is a BNG-UP device accessed by the terminal, the first policy indicates the first service chain, and the first service chain includes an entity configured to implement the first service function combination. The BNG-CP device sends the first user entry information to the second BNG-UP device, where the first user entry information includes the identifier of the first policy and the identifier of the terminal. In this way, the second BNG-UP device receives the traffic of the terminal, where the traffic includes the identifier of the terminal, obtains the first policy based on the identifier of the terminal and the first user entry information, and sends the traffic to the first service chain based on the first policy. Because the first service chain has service functions in the first service function combination, when the traffic of the terminal is transmitted by using the first service chain, services corresponding to the service functions in the first service function combination may be provided for the traffic. When receiving the packet, the BNG-CP device determines the first service function combination and sends the identifier of each service function in the first service function combination to the controller, so that the controller configures the first policy based on the first service function combination. In addition, the first user entry information sent by the BNG-CP device to the second BNG-UP device includes the identifier of the terminal and the identifier of the first policy, the first user entry information indicates the second BNG-UP device to forward the traffic of the terminal. Therefore, different service function combinations do not need to be exhaustively listed in advance, each exhaustive service function combination and an address pool corresponding to each service function combination do not need to be stored in the server in advance, and a policy and an address pool corresponding to each exhaustive service function combination do not need to be stored in the BNG-UP device in advance, thereby consuming fewer storage resources of the server and the BNG-UP device, and consuming fewer policy resources. In addition, because the user entry information includes the identifier of the first policy and the identifier of the terminal, the first policy may be refined to a terminal granularity.

Figure 6A:
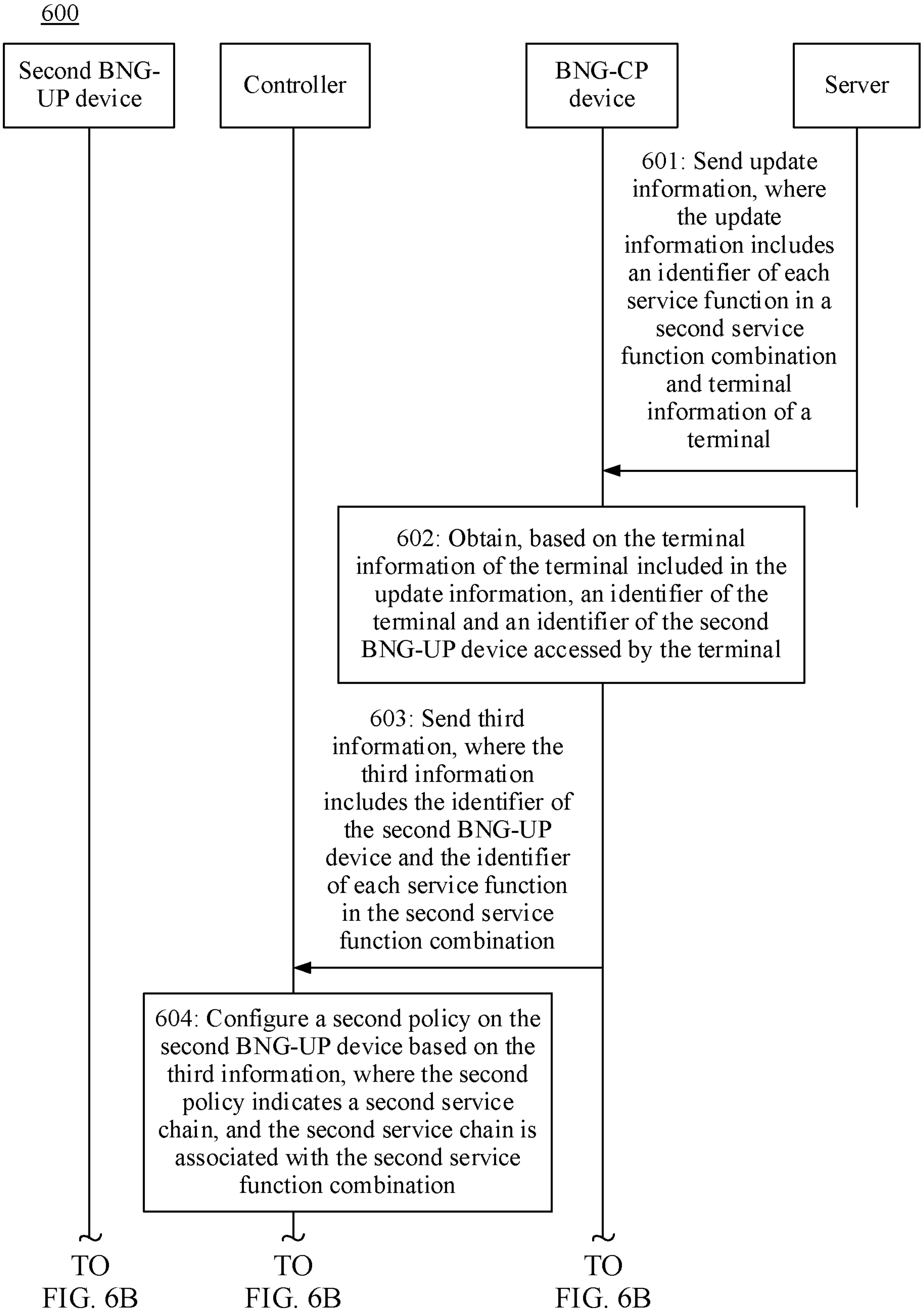
FIG. 6A and FIG. 6B are a flowchart of another traffic sending method according to an embodiment of this application.
Figure 6B:
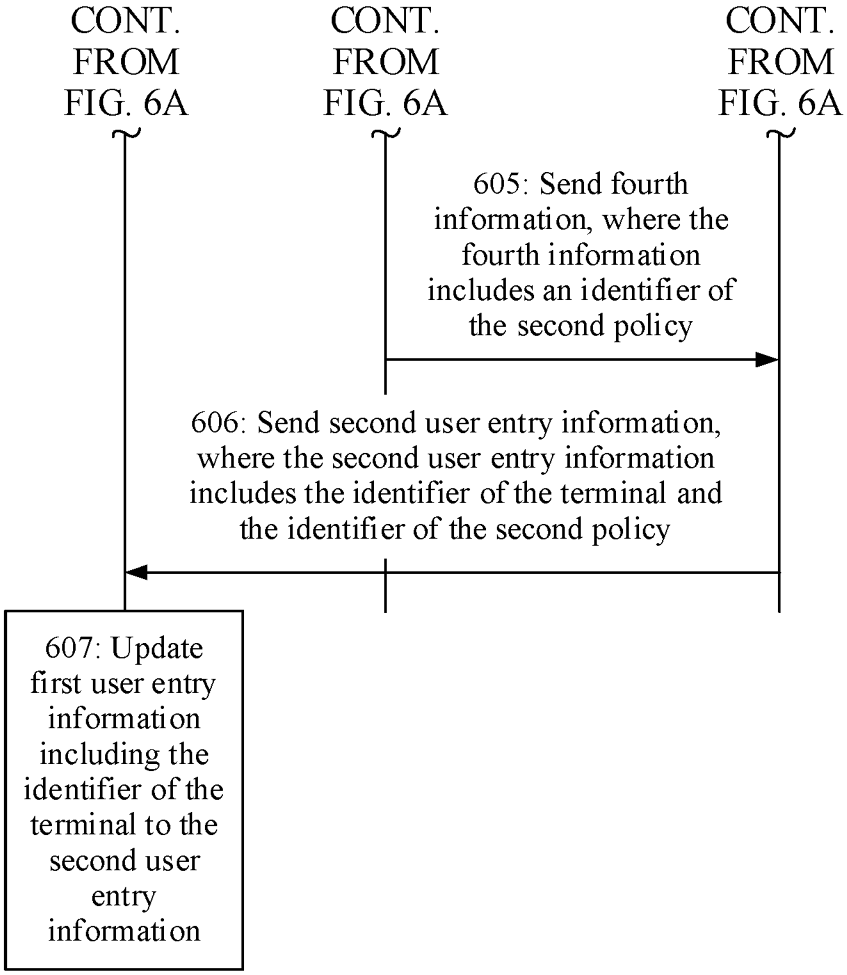

Refer to FIG. 6A and FIG. 6B. An embodiment of this application provides a service updating method 600. The method 600 is applied to the network architectures 100 shown in FIG. 1 to FIG. 4, and includes the following steps.

Step 601: A server sends update information to a BNG-CP device, where the update information includes an identifier of each service function in a second service function combination and terminal information of a terminal.

A user corresponding to the terminal may re-subscribe to at least one service function with an operator. The operator may input the identifier of the terminal and the at least one re-subscribed service function to the server. The server updates, in a first correspondence, an identifier of the at least one service function corresponding to the terminal information of the terminal to an identifier of the at least one re-subscribed service function, and sends the update information to the BNG-CP device.

The second service function combination includes the identifier of the re-subscribed service function. The second service function combination may further include an identifier of a default service function.

In some embodiments, a first application is installed on the terminal, and the user corresponding to the terminal re-subscribes to at least one service function corresponding to the first application with the operator. Correspondingly, the update information can further include application information of the first application.

Step 602: The BNG-CP device receives the update information, and obtains, based on the terminal information of the terminal included in the update information, an identifier of the terminal and an identifier of a second BNG-UP device accessed by the terminal.

In step 602, the BNG-CP device receives the update information, and obtains, from a third correspondence based on the terminal information included in the update information, the identifier of the terminal and the identifier of the second BNG-UP device accessed by the terminal, where the third correspondence is used to store a correspondence between the terminal information of the terminal, the identifier of the terminal, and the identifier of the BNG-UP device.

Step 603: The BNG-CP device sends third information to the controller, where the third information includes the identifier of the second BNG-UP device and the identifier of each service function in the second service function combination.

In some embodiments, the third information further includes the identifier of the terminal and/or the application information of the first application.

In other words, the third information includes the identifier of the second BNG-UP device and the identifier of each service function in the first service function combination, and the third information may further include one or more of the application information of the first application, the identifier of the terminal, and the like.

Step 604: The controller receives the third information, and configures a second policy on the second BNG-UP device based on the third information, where the second policy indicates a second service chain, and the second service chain is associated with the second service function combination.

For a detailed implementation in which the controller configures the second policy on the second BNG-UP device based on the third information, refer to the detailed implementation in step 505 of configuring the first policy in the method 500 shown in FIG. 5A and FIG. 5B. Details are not described herein again.

Step 605: The controller sends fourth information to the BNG-CP device, where the fourth information includes an identifier of the second policy.

Step 606: The BNG-CP device receives the fourth information, and sends second user entry information to the second BNG-UP device, where the second user entry information includes the identifier of the terminal and the identifier of the second policy.

Step 607: The second BNG-UP device receives the second user entry information, and updates the first user entry information including the identifier of the terminal to the second user entry information.

When receiving traffic of the terminal, the second BNG-UP device sends the traffic to the second service chain based on the identifier of the terminal in the traffic and the second user entry information. For a detailed process of sending the traffic, refer to steps 508 and 509 in the method 500 shown in FIG. 5A and FIG. 5B, and details are not described herein again.

In this embodiment of this application, when a service function of the terminal changes, the BNG-CP device sends the identifier of each service function in the second service function combination to the controller, so that the controller performs the second policy on the second BNG-UP device based on the second service function combination. The BNG-CP device sends the second user entry information to the second BNG-UP device, where the second user entry information includes the identifier of the terminal and the identifier of the second policy. The second BNG-UP device updates the first user entry information to the second user entry information, to update the service function combination. However, the identifier of the terminal does not need to be changed in an update process. In this way, when the service function of the terminal changes, the terminal does not need to re-dial, and the service function of the terminal is dynamically adjusted online.

Figure 7:
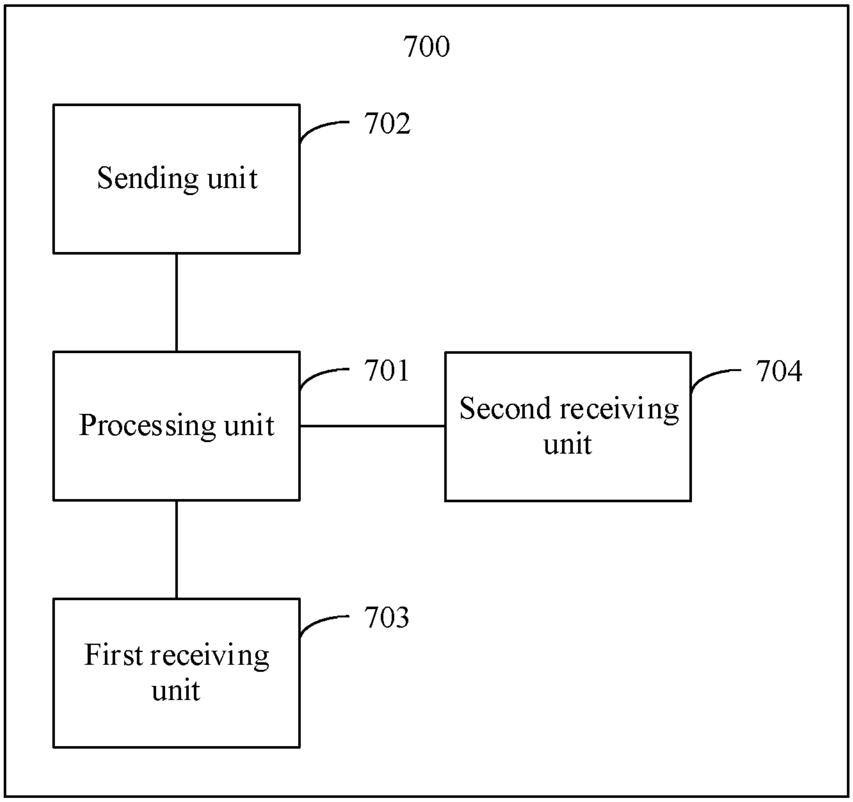
FIG. 7 is a schematic diagram of a structure of a traffic sending apparatus according to an embodiment of this application.

Refer to FIG. 7. An embodiment of this application provides a traffic sending apparatus 700. The apparatus 700 is deployed on the BNG-CP device in the network architectures 100 shown in FIG. 1 to FIG. 3, or is deployed on the BNG-CP device in the method 500 shown in FIG. 5A and FIG. 5B or the BNG-CP device in the method 600 shown in FIG. 6A and FIG. 6B, and includes:

a processing unit 701, configured to obtain, based on a packet sent by a terminal, a first service function combination corresponding to the terminal, where the first service function combination includes at least one service function; and the processing unit 701 is further configured to configure a first policy on a user plane device based on the first service function combination, where the user plane device is a user plane device accessed by the terminal, the first policy indicates a first service chain, and the first service chain corresponds to the first service function combination; and a sending unit 702, configured to send first user entry information to the user plane device, where the first user entry information includes an identifier of the first policy and an identifier of the terminal, and the first user entry information indicates the user plane device to send traffic from the terminal to the first service chain based on the first policy.

Optionally, for detailed content of obtaining the first service function combination by the processing unit 701, refer to related content in step 503 in the method 500 shown in FIG. 5A and FIG. 5B. Details are not described herein again.

Optionally, for detailed content of configuring the first policy by the processing unit 701, refer to related content in steps 505 and **5*o*6 in the method 500 shown in FIG. 5**. Details are not described herein again.

Optionally, the first policy includes a first segment list, and the first segment list includes a segment identifier of the first service function combination.

Optionally, the first policy includes information about a tunnel between the user plane device and a first service function forwarder SFF, and the first SFF is associated with the first service chain.

The processing unit 701 is configured to generate the first policy based on the first service function combination.

The sending unit 702 is configured to send the first policy to the user plane device.

Optionally, the first policy includes the information about the tunnel between the user plane device and the first SFF, and the sending unit 702 is further configured to send routing information to the first SFF, where the routing information includes the identifier of the terminal, and the routing information indicates the first SFF to send the traffic from the terminal to the first service chain.

Optionally, the sending unit 702 is configured to send first information to a controller, where the first information includes the identifier of each service function in the first service function combination and the identifier of the user plane device, and the first information is used to trigger the controller to configure the first policy on the user plane device.

Optionally, for detailed content of sending the first information by the sending unit 702, refer to related content in step 504 of the method 500 shown in FIG. 5A and FIG. 5B. Details are not described herein again.

Optionally, the apparatus 700 further includes a first receiving unit 703, configured to receive second information sent by the controller, where the second information includes the identifier of the first policy.

Optionally, the first policy includes the information about the tunnel between the user plane device and the first SFF, the first information further includes the identifier of the terminal, the first information is used to trigger the controller to send the routing information to the first SFF, and the routing information indicates the first SFF to send the traffic from the terminal to the first service chain.

Optionally, the processing unit 701 is further configured to obtain application information of a first application, where the first application is an application on the terminal, and the first policy includes the application information of the first application.

Optionally, for detailed content of obtaining the application information of the first application by the processing unit 701, refer to related content in step 503 in the method 500 shown in FIG. 5A and FIG. 5B. Details are not described herein again.

Optionally, the packet sent by the terminal includes a dialup packet, the dialup packet includes terminal information of the terminal, and the terminal information includes one or more of the identifier of the terminal and account information corresponding to the terminal.

The processing unit 701 is configured to obtain the first service function combination based on the terminal information.

Optionally, for detailed content of obtaining the first service function combination by the processing unit 701, refer to related content in step 503 in the method 500 shown in FIG. 5A and FIG. 5B. Details are not described herein again.

Optionally, the packet sent by the terminal includes a data packet or an address resolution protocol ARP packet, the terminal is a terminal that obtains a static address, the data packet includes the identifier of the terminal, and the ARP packet includes the identifier of the terminal.

The processing unit 701 is configured to obtain the first service function combination based on the identifier of the terminal.

Optionally, for detailed content of obtaining the first service function combination by the processing unit 701, refer to related content in step 503 in the method 500 shown in FIG. 5A and FIG. 5B. Details are not described herein again.

The apparatus 700 further includes a second receiving unit 704.

The second receiving unit 704 is further configured to receive an update message, where the update message includes a second service function combination corresponding to the terminal, the second service function combination includes at least one service function, and the first service function combination is different from the second service function combination.

The processing unit 701 is further configured to configure a second policy on the user plane device based on the second service function combination, where the second policy indicates a second service chain, and the second service chain corresponds to the second service function combination.

The sending unit 703 is further configured to send second user entry information to the user plane device, where the second user entry information includes an identifier of the second policy and the identifier of the terminal, and the second user entry information indicates the user plane device to send the traffic from the terminal to the second service chain based on the second policy.

Optionally, for detailed content of configuring the second policy by the processing unit 701, refer to related content in steps 603 to 605 in the method 600 shown in FIG. 6A and FIG. 6B. Details are not described herein again.

In this embodiment of this application, because the processing unit configures the first policy for the first service function combination of the terminal on the user plane device only when the receiving unit receives the packet of the terminal, the first policy indicates the first service chain, and the first service chain includes an entity used to implement the first service function combination, the first policy does not need to be preconfigured for the first service function combination, thereby avoiding a waste of policy resources. In addition, because the sending unit sends the first user entry information to the user plane device, and the first user entry information includes the identifier of the terminal and the identifier of the first policy, after receiving the traffic of the terminal, the user plane device obtains the first policy based on the identifier of the terminal included in the traffic and the first user entry information, and sends the traffic to the first service chain based on the first policy, to ensure that the traffic can be successfully sent to the first service chain. In this way, a large quantity of service function combinations do not need to be preconfigured, and different address pools do not need to be allocated to each service function combination. The server does not need to store each service function combination and an address pool corresponding to each service function combination. The user plane device does not need to store an address pool and a policy corresponding to each service function combination. In this way, not only fewer storage resources of the user plane device and the server can be consumed, but also fewer policy resources can be consumed, thereby avoiding a waste of policy resources. In addition, because content included in the user entry information is the identifier of the first policy and the identifier of the terminal, the first policy may be refined to a terminal granularity.

Figure 8:
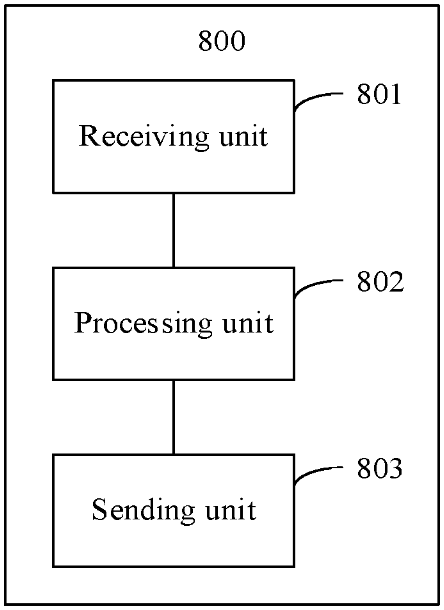
FIG. 8 is a schematic diagram of a structure of another traffic sending apparatus according to an embodiment of this application.

Refer to FIG. 8. An embodiment of this application provides a traffic sending apparatus 800. The apparatus 800 is deployed on the controller in the network architectures 100 shown in FIG. 1 to FIG. 4, or is deployed on the controller in the method 500 shown in FIG. 5A and FIG. 5B or the controller in the method 600 shown in FIG. 6A and FIG. 6B, and includes:

a receiving unit 801, configured to receive first information sent by a control plane device, where the first information includes an identifier of each service function in a first service function combination and an identifier of a user plane device, the first service function combination includes at least one service function corresponding to a terminal, the first service function combination is obtained by the control plane device based on a packet sent by the terminal, and the user plane device is a user plane device accessed by the terminal;

a processing unit 802, configured to configure a first policy on the user plane device based on the first information, where the first policy indicates a first service chain, and the first service chain corresponds to the first service function combination; and a sending unit 803, configured to send second information to the control plane device, where the second information includes an identifier of the first policy, the second information is used to trigger the control plane device to send first user entry information to the user plane device, the first user entry information includes the identifier of the terminal and the identifier of the first policy, and the first user entry information indicates the user plane device to send traffic from the terminal to the first service chain based on the first policy.

Optionally, for detailed content of configuring the first policy by the processing unit 802, refer to related content in steps 505 and 506 in the method 500 shown in FIG. 5A and FIG. 5B. Details are not described herein again.

Optionally, the processing unit 802 is configured to generate the first policy based on the identifier of each service function in the first service function combination.

The sending unit 803 is configured to send the first policy to the user plane device based on the identifier of the user plane device.

Optionally, for detailed content of generating the first policy by the processing unit 802, refer to related content in step 505 in the method 500 shown in FIG. 5A and FIG. 5B. Details are not described herein again.

Optionally, the first policy includes a first segment list, and the first segment list includes a segment identifier of the first service function combination.

Optionally, the first policy includes information about a tunnel between the user plane device and a first service function forwarder SFF, and the first SFF is associated with the first service chain.

Optionally, the first information further includes the identifier of the terminal, and the sending unit 803 is further configured to send routing information to the first SFF, the routing information includes the identifier of the terminal, and the routing information indicates the first SFF to send the traffic from the terminal to the first service chain.

Optionally, the first information further includes application information of a first application, the first application is an application on the terminal, and the first policy includes the application information of the first application.

Optionally, the packet sent by the terminal includes a dialup packet, the dialup packet includes terminal information of the terminal, and the terminal information includes one or more of the identifier of the terminal, a location of the terminal, and account information corresponding to the terminal. The first service function combination is obtained by the control plane device based on the terminal information.

Optionally, the packet sent by the terminal includes a data packet or an address resolution protocol ARP packet, the terminal is a terminal that obtains a static address, the data packet includes the identifier of the terminal, and the ARP packet includes the identifier of the terminal. The first service function combination is obtained by the control plane device based on the identifier of the terminal.

In this embodiment of this application, the receiving unit receives the first information sent by the control plane device, where the first information includes the identifier of each service function in the first service function combination and the identifier of the user plane device. The processing unit configures the first policy corresponding to the first service function combination on the user plane device based on the first information, the first policy indicates the first service chain, and the first service chain corresponds to the first service function combination. The sending unit sends the second information to the control plane device, where the second information includes the identifier of the first policy. Because the first information received by the receiving unit includes the identifier of each service function in the first service function combination and the identifier of the user plane device, and the user plane device is a device accessed by the terminal, the processing unit configures the first policy corresponding to the first service function combination on the user plane device based on the first information. In this way, the first policy is configured on the user plane device only when the terminal sends the packet. Therefore, the first policy does not need to be preconfigured for the first service function combination, thereby avoiding a waste of policy resources. In addition, because the second information sent by the sending unit to the control plane device includes the identifier of the first policy, the first user entry information sent by the control plane device to the user plane device includes the identifier of the terminal and the identifier of the first policy. After receiving the traffic of the terminal, the user plane device obtains the first policy based on the identifier of the terminal included in the traffic and the first user entry information, and sends the traffic to the first service chain based on the first policy. In this way, a large quantity of service function combinations do not need to be preconfigured, and different address pools do not need to be allocated to each service function combination, each service function combination and an address pool corresponding to each service function combination do not need to be stored in the server, and a correspondence between an address pool of each service function combination and a policy does not need to be stored in the user plane device. In this way, fewer storage resources of the user plane device and the server can be consumed. In addition, because content included in the user entry information is the identifier of the first policy and the identifier of the terminal, the first policy may be refined to a terminal granularity.

Figure 9:
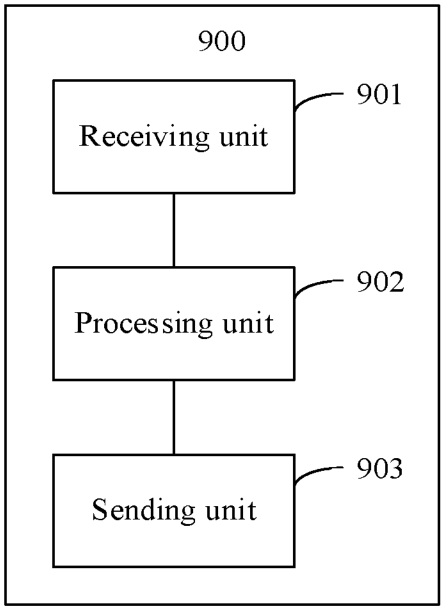
FIG. 9 is a schematic diagram of a structure of another traffic sending apparatus according to an embodiment of this application.

Refer to FIG. 9. An embodiment of this application provides a traffic sending apparatus 900. The apparatus 900 is deployed on the user plane device in the network architectures boo shown in FIG. 1 to FIG. 4, or is deployed on the user plane device in the method 500 shown in FIG. 5A and FIG. 5B or the user plane device in the method 60*o* shown in FIG. 6A and FIG. 6B, and includes:

a receiving unit 901, configured to receive a first policy, where the apparatus 900 is a user plane device accessed by a terminal, the first policy is obtained based on a first service function combination, the first service function combination is obtained by a control plane device based on a packet sent by the terminal, the first service function combination includes at least one service function corresponding to the terminal, the first policy indicates a first service chain, and the first service chain corresponds to the first service function combination.

The receiving unit 901 is further configured to receive first user entry information sent by the control plane device, where the first user entry information includes an identifier of the first policy and an identifier of the terminal, and the first user entry information indicates the apparatus 900 to send traffic from the terminal to the first service chain based on the first policy.

Optionally, the apparatus 900 further includes a processing unit 902.

The receiving unit 901 is further configured to receive a second policy, where the second policy is obtained based on a second service function combination, the second service function combination includes at least one service function corresponding to the terminal, the second service function combination is different from the first service function combination, the second policy indicates a second service chain, and the second service chain corresponds to the second service function combination.

The receiving unit 901 is further configured to receive second user entry information sent by the control plane device, where the second user entry information includes an identifier of the second policy and the identifier of the terminal.

The processing unit 902 is further configured to update the first user entry information to the second user entry information.

Optionally, the first policy includes a first segment list, and the first segment list includes a segment identifier of the first service function combination.

Optionally, the first policy includes information about a tunnel between the user plane device and a first service function forwarder SFF, and the first SFF is associated with the first service chain.

Optionally, the first policy further includes application information of the first application, and the first application is an application on the terminal.

Optionally, the apparatus further includes a sending unit 903.

The receiving unit 901 is further configured to receive the packet sent by the terminal.

The sending unit 903 is configured to send the packet to the control plane device.

Optionally, the packet sent by the terminal includes a dialup packet, the dialup packet includes terminal information of the terminal, and the terminal information includes one or more of the identifier of the terminal, a location of the terminal, and account information corresponding to the terminal. The first service function combination is obtained by the control plane device based on the terminal information.

Optionally, the packet sent by the terminal includes a data packet or an address resolution protocol ARP packet, the terminal is a terminal that obtains a static address, the data packet includes the identifier of the terminal, and the ARP packet includes the identifier of the terminal. The first service function combination is obtained by the control plane device based on the identifier of the terminal.

In this embodiment of this application, when the receiving unit receives the packet of the terminal, the sending unit sends the packet to the control plane device. The packet is used to trigger the control plane device to obtain the first service function combination corresponding to the terminal, and configure the first policy corresponding to the first service function combination on the apparatus. Therefore, the first policy corresponding to the first service function combination is configured only when the terminal sends the packet, and the first policy does not need to be preconfigured for the first service function combination. In addition, the first user entry information that is sent by the control plane device and that is received by the receiving unit includes the identifier of the terminal and the identifier of the first policy. In this way, after the receiving unit receives the traffic of the terminal, the sending unit forwards, based on the identifier of the terminal included in the traffic and the first policy information, the traffic to the first service chain indicated by the first policy, to ensure that the traffic can be successfully sent to the first service chain. In this way, a large quantity of service function combinations do not need to be preconfigured, and different address pools do not need to be allocated to each service function combination. The server does not need to store each service function combination and an address pool corresponding to each service function combination. The apparatus does not need to store an address pool and a policy that correspond to each service function combination. In this way, not only fewer storage resources of the apparatus and the server can be consumed, but also fewer policy resources can be consumed. In addition, because the user entry information includes the identifier of the first policy and the identifier of the terminal, the first policy may be refined to a terminal granularity.

Figure 10:
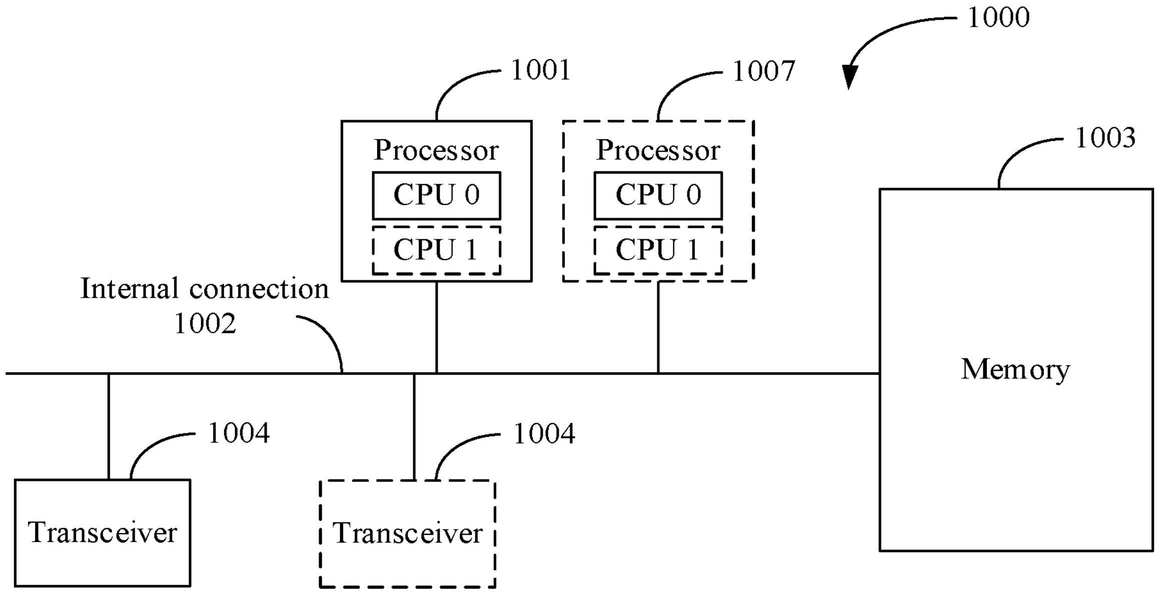
FIG. 10 is a schematic diagram of a structure of another traffic sending apparatus according to an embodiment of this application.

Refer to FIG. 10. An embodiment of this application provides a traffic sending apparatus 1000. The apparatus 1000 may be the BNG-CP device in any one of the foregoing embodiments. The apparatus 1000 includes at least one processor 1001, an internal connection 1002, a memory 1003, and at least one transceiver 1004.

The apparatus 1000 is an apparatus of a hardware structure, and may be configured to implement function modules in the apparatus 700 shown in FIG. 7. For example, a person skilled in the art may figure out that the processing unit 701 in the apparatus 700 shown in FIG. 7 may be implemented by the at least one processor 1001 by invoking code in the memory 1003, and the sending unit 702, the first receiving unit 703, and the second receiving unit 704 in the apparatus 700 shown in FIG. 7 may be implemented by the transceiver 1004.

Optionally, the apparatus 1000 may be further configured to implement a function of the BNG-CP device in any one of the foregoing embodiments.

Optionally, the processor 1001 may be a general-purpose central processing unit (CPU), a network processor (NP), a microprocessor, an application-specific integrated circuit (ASIC), or one or more integrated circuits configured to control program execution of solutions of this application.

The internal connection 1002 may include a path for transmitting information between the foregoing components. Optionally, the internal connection 1002 is a board, a bus, or the like.

The transceiver 1004 is configured to communicate with another device or a communication network.

The memory 1003 may be a read-only memory (ROM) or another type of static storage device that can store static information and instructions, or a random access memory (RAM) or another type of dynamic storage device that can store information and instructions, or may be an electrically erasable programmable read-only memory (EPROM), a compact disc read-only memory (CD-ROM) or another compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 1003 is not limited thereto. The memory may exist independently, and is connected to the processor through the bus. The memory may alternatively be integrated with the processor.

The memory 1003 is configured to store application program code for executing the solutions of this application, and the processor 1001 controls the execution. The processor 1001 is configured to execute the application program code stored in the memory 1003, and cooperate with the at least one transceiver 1004, so that the apparatus 1000 implements a function in the method in this patent.

During specific implementation, in an embodiment, the processor 1001 may include one or more CPUs, for example, a CPU 0 and a CPU 1 in FIG. 10.

In specific implementation, in an embodiment, the apparatus 1000 may include a plurality of processors, for example, the processor 1001 and a processor 1007 in FIG. 10. Each of the processors may be a single-core (single-CPU) processor, or may be a multi-core (multi-CPU) processor. The processor herein may be one or more devices, circuits, and/or processing cores configured to process data (for example, computer program instructions).

Figure 11:
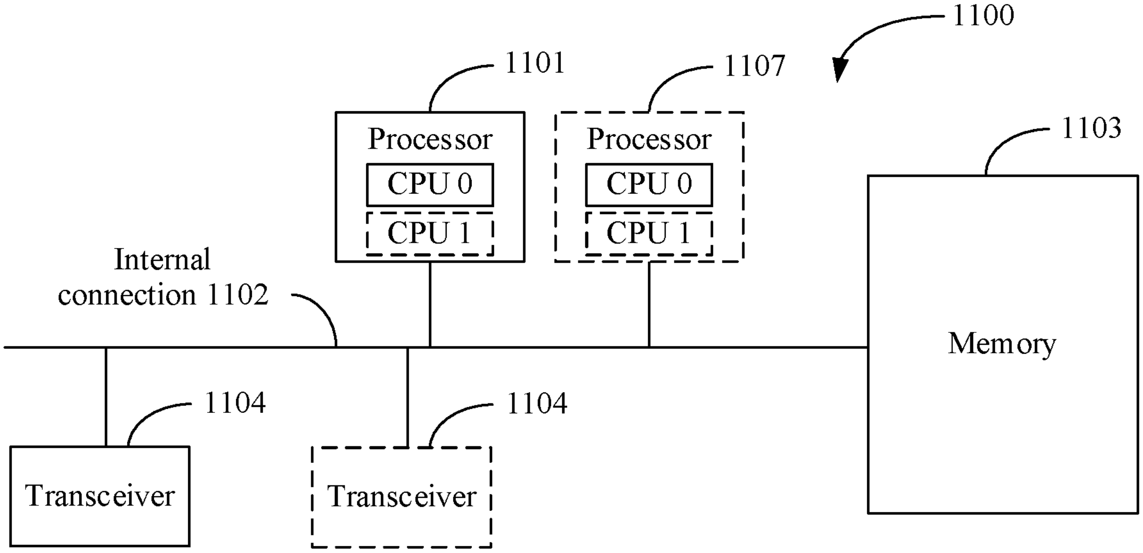
FIG. 11 is a schematic diagram of a structure of another traffic sending apparatus according to an embodiment of this application.

Refer to FIG. 11. An embodiment of this application provides a schematic diagram of a traffic sending apparatus 1100. The apparatus 1100 may be the controller in any one of the foregoing embodiments. The apparatus 1100 includes at least one processor 1101, an internal connection 1102, a memory 1103, and at least one transceiver 1104.

The apparatus 1100 is an apparatus of a hardware structure, and may be configured to implement the function modules in the apparatus 800 shown in FIG. 8. For example, a person skilled in the art may figure out that the processing unit 802 in the apparatus 800 shown in FIG. 8 may be implemented by the at least one processor 1101 by invoking code in the memory 1103, and the receiving unit 801 and the sending unit 803 in the apparatus 800 shown in FIG. 8 may be implemented by the transceiver 1104.

Optionally, the apparatus 1100 may be further configured to implement a function of the controller in any one of the foregoing embodiments.

Optionally, the processor 1101 may be a general-purpose central processing unit (CPU), a network processor (NP), a microprocessor, an application-specific integrated circuit (ASIC), or one or more integrated circuits configured to control program execution of the solutions of this application.

The internal connection 1102 may include a path for transmitting information between the foregoing components. Optionally, the internal connection 1102 is a board, a bus, or the like.

The transceiver 1104 is configured to communicate with another device or a communication network.

The memory 1103 may be a read-only memory (ROM) or another type of static storage device capable of storing static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disc storage medium or another magnetic storage device, or any other medium that can carry or store expected program code in a form of an instruction or a data structure and that can be accessed by a computer. However, the memory 1103 is not limited thereto. The memory may exist independently, and is connected to the processor through the bus. The memory may alternatively be integrated with the processor.

The memory 1103 is configured to store application program code for executing the solutions of this application, and the processor 1101 controls the execution. The processor 1101 is configured to execute the application program code stored in the memory 1103, and cooperate with the at least one transceiver 1104, so that the apparatus 1100 implements functions in the method in this patent.

In specific implementation, in an embodiment, the processor 1101 may include one or more CPUs such as a CPU 0 and a CPU 1 in FIG. 11.

In specific implementation, in an embodiment, the apparatus 1100 may include a plurality of processors, for example, the processor 1101 and a processor 1107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

Figure 12:
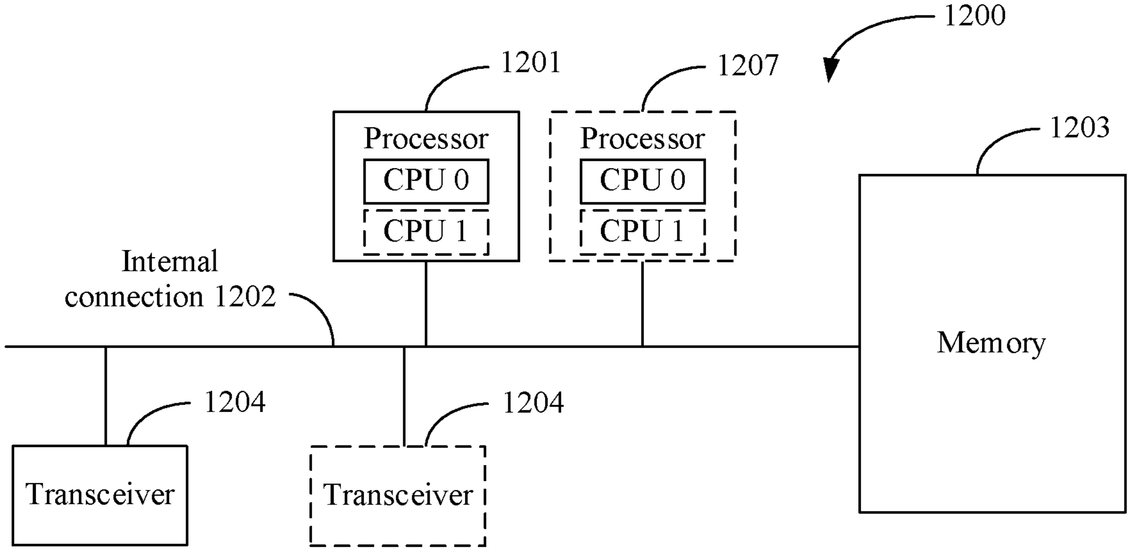
FIG. 12 is a schematic diagram of a structure of another traffic sending apparatus according to an embodiment of this application.

Refer to FIG. 12. An embodiment of this application provides a traffic sending apparatus 1200. The apparatus 1200 may be the controller in any one of the foregoing embodiments. The apparatus 1200 includes at least one processor 1201, an internal connection 1202, a memory 1203, and at least one transceiver 1204.

The apparatus 1200 is an apparatus of a hardware structure, and may be configured to implement the function modules in the apparatus 900 in FIG. 9. For example, a person skilled in the art may figure out that the processing unit 902 in the apparatus 900 shown in FIG. 9 may be implemented by the at least one processor 1201 by invoking code in the memory 1203, and the receiving unit 901 and the sending unit 903 in the apparatus 900 shown in FIG. 9 may be implemented by the transceiver 1204.

Optionally, the apparatus 1200 may be further configured to implement a function of the BNG-UP device in any one of the foregoing embodiments.

Optionally, the processor 1201 may be a general-purpose central processing unit (CPU), a network processor (NP), a microprocessor, an application-specific integrated circuit (ASIC), or one or more integrated circuits configured to control program execution of the solutions of this application.

The internal connection 1202 may include a path for transmitting information between the foregoing components. Optionally, the internal connection 1202 is a board, a bus, or the like.

The transceiver 1204 is configured to communicate with another device or a communication network.

The memory 1203 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray optical disc, and the like), a magnetic disc storage medium or another magnetic storage device, or any other medium that can carry or store expected program code in a form of an instruction or a data structure and that can be accessed by a computer. However, the memory 1203 is not limited thereto. The memory may exist independently, and is connected to the processor through the bus. The memory may alternatively be integrated with the processor.

The memory 1203 is configured to store application program code for executing the solutions of this application, and the processor 1201 controls the execution. The processor 1201 is configured to execute the application program code stored in the memory 1203, and cooperate with the at least one transceiver 1204, so that the apparatus 1200 implements functions in the method in this patent.

In specific implementation, in an embodiment, the processor 1201 may include one or more CPUs such as a CPU 0 and a CPU 1 in FIG. 12.

In specific implementation, in an embodiment, the apparatus 1200 may include a plurality of processors, for example, the processor 1201 and a processor 1207 in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

Figure 13:
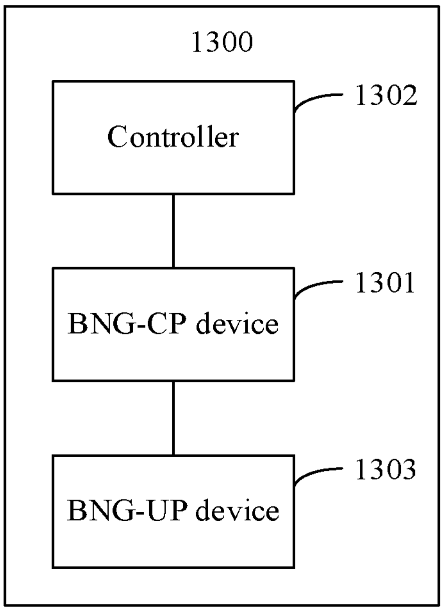
FIG. 13 is a schematic diagram of a structure of a traffic sending system according to an embodiment of this application.

Refer to FIG. 13. An embodiment of this application provides a schematic diagram of a traffic sending system 1300. The system 1300 includes the apparatus 700 shown in FIG. 7, the apparatus 800 shown in FIG. 8, and the apparatus 900 shown in FIG. 9, or the system 1300 includes the apparatus 1000 shown in FIG. 10, the apparatus 1100 shown in FIG. 11, and the apparatus 1200 shown in FIG. 12.

The apparatus 700 shown in FIG. 7 or the apparatus 1000 shown in FIG. 10 may be a BNG-CP device 1301, the apparatus 800 shown in FIG. 8 or the apparatus 1100 shown in FIG. 11 may be a controller 1302, and the apparatus 900 shown in FIG. 9 or the apparatus 1200 shown in FIG. 12 may be a BNG-UP device 1303.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this application, but are not intended to limit this application. Any modification, equivalent replacement, or improvement made within the principle of this application should fall within the protection scope of this application.

What is claimed is:

1. A network device, applied to a control plane device, wherein the network device comprises:

one or more memories configured to store instructions; and one or more processors coupled to the one or more memories and configured to execute the instructions to cause the network device to perform operations including:

obtaining, based on terminal information of a terminal in a packet sent by the terminal, a first service function combination corresponding to the terminal, wherein the first service function combination comprises at least one service function, the terminal information comprises one or more of a terminal identifier of the terminal or account information corresponding to the terminal, the packet sent by the terminal comprises a dialup packet, and the dialup packet comprises the terminal information of the terminal;

configuring a first policy on a user plane device based on the first service function combination, wherein the user plane device is accessed by the terminal, the first policy indicates a first service chain, and the first service chain corresponds to the first service function combination; and sending first user entry information to the user plane device, wherein the first user entry information comprises a policy identifier of the first policy and the terminal identifier of the terminal, and the first user entry information indicates the user plane device to send traffic from the terminal to the first service chain based on the first policy.

2. The network device according to claim 1, wherein the first policy comprises a first segment list, and the first segment list comprises a segment identifier of the first service function combination, or wherein the first policy comprises information about a tunnel between the user plane device and a first service function forwarder (SFF), and the first SFF is associated with the first service chain.

3. The network device according to claim 2, the operations further comprising:

generating the first policy based on the first service function combination; and sending the first policy to the user plane device.

4. The network device according to claim 2, wherein the first policy comprises the information about the tunnel between the user plane device and the first SFF, the operations further comprising:

sending routing information to the first SFF, wherein the routing information comprises the terminal identifier of the terminal, and the routing information indicates the first SFF to send the traffic from the terminal to the first service chain.

5. The network device according to claim 2, the operations further comprising:

sending first information to a controller, wherein the first information comprises a corresponding identifier of each service function in the first service function combination and a user plane device identifier of the user plane device, and the first information triggers the controller to configure the first policy on the user plane device.

6. The network device according to claim 5, the operations further comprising:

receiving second information sent by the controller, wherein the second information comprises the policy identifier of the first policy.

7. The network device according to claim 5, wherein the first policy comprises the information about the tunnel between the user plane device and the first SFF, the first information further comprises the terminal identifier of the terminal, the first information triggers the controller to send routing information to the first SFF, and the routing information indicates the first SFF to send the traffic from the terminal to the first service chain.

8. The network device according to claim 1, the operations further comprising:

obtaining application information of a first application, wherein the first application is on the terminal, and the first policy comprises the application information of the first application.

9. The network device according to claim 1, wherein the packet sent by the terminal comprises a data packet or an address resolution protocol (ARP) packet, the terminal obtains a static address, the data packet comprises the terminal identifier of the terminal, and the ARP packet comprises the terminal identifier of the terminal, the obtaining the first service function combination comprising:

obtaining the first service function combination based on the terminal identifier of the terminal.

10. The network device according to claim 1, the operations further comprising:

receiving an update message, wherein the update message comprises a second service function combination corresponding to the terminal, the second service function combination comprises second at least one service function, and the first service function combination is different from the second service function combination;

configuring a second policy on the user plane device based on the second service function combination, wherein the second policy indicates a second service chain, and the second service chain corresponds to the second service function combination; and sending second user entry information to the user plane device, wherein the second user entry information comprises a second policy identifier of the second policy and the terminal identifier of the terminal, and the second user entry information indicates the user plane device to send the traffic from the terminal to the second service chain based on the second policy.

11. A network device, applied to a user plane device, wherein the network device comprises:

one or more memories configured to store instructions; and one or more processors coupled to the one or more memories and configured to execute the instructions to cause the network device to perform operations including:

receiving a first policy, wherein the user plane device is accessed by a terminal, the first policy is obtained based on a first service function combination, the first service function combination is obtained by a control plane device based on terminal information of the terminal in a packet sent by the terminal, the first service function combination comprises at least one service function corresponding to the terminal, the first policy indicates a first service chain, the first service chain corresponds to the first service function combination, the terminal information comprises one or more of a terminal identifier of the terminal or account information corresponding to the terminal, the packet sent by the terminal comprises a dialup packet, and the dialup packet comprises the terminal information of the terminal; and receiving first user entry information sent by the control plane device, wherein the first user entry information comprises a policy identifier of the first policy and the terminal identifier of the terminal, and the first user entry information indicates the user plane device to send traffic from the terminal to the first service chain based on the first policy.

12. The network device according to claim 11, the operations further comprising:

receiving a second policy, wherein the second policy is obtained based on a second service function combination, the second service function combination comprises second at least one service function corresponding to the terminal, the second service function combination is different from the first service function combination, the second policy indicates a second service chain, and the second service chain corresponds to the second service function combination;

receiving second user entry information sent by the control plane device, wherein the second user entry information comprises a second policy identifier of the second policy and the terminal identifier of the terminal; and updating the first user entry information to the second user entry information.

13. A network system, comprising a control plane device and a user plane device, wherein the control plane device is configured to:

obtain, based on terminal information of a terminal in a packet sent by the terminal, a first service function combination corresponding to the terminal, wherein the first service function combination comprises at least one service function, the terminal information comprises one or more of a terminal identifier of the terminal or account information corresponding to the terminal, the packet sent by the terminal comprises a dialup packet, and the dialup packet comprises the terminal information of the terminal;

configure a first policy on the user plane device based on the first service function combination, wherein the user plane device is accessed by the terminal, the first policy indicates a first service chain, and the first service chain corresponds to the first service function combination; and send first user entry information to the user plane device, and wherein the user plane device is configured to:

receive the first user entry information sent by the control plane device, wherein the first user entry information indicates the user plane device to send traffic from the terminal to the first service chain based on the first policy.

14. The network system according to claim 13, wherein the first policy comprises a first segment list, and the first segment list comprises a segment identifier of the first service function combination, or wherein the first policy comprises information about a tunnel between the user plane device and a first service function forwarder (SFF), and the first SFF is associated with the first service chain.

15. The network system according to claim 14, wherein the control plane device is further configured to:

generate the first policy based on the first service function combination; and send the first policy to the user plane device.

16. The network system according to claim 15, wherein the first policy comprises the information about the tunnel between the user plane device and the first SFF, and wherein the control plane device is further configured to:

send routing information to the first SFF, wherein the routing information comprises the terminal identifier of the terminal, and the routing information indicates the first SFF to send the traffic from the terminal to the first service chain.

17. The network system according to claim 14, wherein the control plane device is further configured to:

send first information to a controller, wherein the first information comprises a corresponding identifier of each service function in the first service function combination and a user plane device identifier of the user plane device, and the first information triggers the controller to configure the first policy on the user plane device.

18. The network system according to claim 17, wherein the control plane device is further configured to:

receive second information sent by the controller, wherein the second information comprises a policy identifier of the first policy.

19. The network system according to claim 17, wherein the first policy comprises the information about the tunnel between the user plane device and the first SFF, the first information further comprises the terminal identifier of the terminal, the first information triggers the controller to send routing information to the first SFF, and the routing information indicates the first SFF to send the traffic from the terminal to the first service chain.

* * * * *